United States Patent
Kamata

(10) Patent No.: US 9,467,071 B2
(45) Date of Patent: Oct. 11, 2016

(54) VOLTAGE RESONANT INVERTER, CONTROL METHOD, AND SURFACE TREATMENT DEVICE

(71) Applicant: Hisahiro Kamata, Kanagawa (JP)

(72) Inventor: Hisahiro Kamata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/853,427

(22) Filed: Sep. 14, 2015

(65) Prior Publication Data

US 2016/0081175 A1    Mar. 17, 2016

(30) Foreign Application Priority Data

Sep. 17, 2014 (JP) .................................. 2014-189491

(51) Int. Cl.
| | | |
|---|---|---|
| *H05B 37/02* | (2006.01) | |
| *H02M 7/539* | (2006.01) | |
| *H02M 1/40* | (2007.01) | |
| *H02M 7/48* | (2007.01) | |

(52) U.S. Cl.
CPC .............. *H02M 7/539* (2013.01); *H02M 1/40* (2013.01); *H02M 2007/4815* (2013.01)

(58) Field of Classification Search
CPC ..................... H01J 37/321; H02M 2001/0003
USPC ....... 315/219, 220, 291, 299, 326, 354, 355, 315/356
See application file for complete search history.

(56) References Cited

U.S. PATENT DOCUMENTS

| | | | | |
|---|---|---|---|---|
| 6,249,444 B1 * | 6/2001 | Cross | ................ | H02M 3/33569 363/131 |
| 6,297,568 B1 * | 10/2001 | Kempinski | ............. | F02P 3/051 123/623 |

(Continued)

FOREIGN PATENT DOCUMENTS

| | | |
|---|---|---|
| JP | 2524942 | 5/1996 |
| JP | 2000-152624 | 5/2000 |
| JP | 3353684 | 9/2002 |

(Continued)

OTHER PUBLICATIONS

U.S. Appl. No. 14/657,961, filed Mar. 13, 2015.

*Primary Examiner* — Thuy Vinh Tran
(74) *Attorney, Agent, or Firm* — Duft Bornsen & Fettig LLP

(57) ABSTRACT

Excitation current is applied to an excitation winding of a step-up transformer by switching an input voltage with a first switching element. Excitation energy stored causes a voltage resonant state in the secondary side of the step-up transformer during a period when the excitation current is shut off. When the excitation current is shut off, a second resonant circuit provided in the primary side of the step-up transformer enters a resonant state. When a second switching element of the second resonant circuit is turned on, energy returning to an input side in a region where the output voltage is negative is commutated through a second diode to be absorbed in the input voltage. The second switching element is kept off while the second resonant circuit is in the resonant state, turned on when the resonant state ends, and turned off after the first switching element is turned on.

13 Claims, 18 Drawing Sheets

(56) References Cited

U.S. PATENT DOCUMENTS

| | | |
|---|---|---|
| 8,971,081 B2 | 3/2015 | Kamata |
| 9,030,856 B2 | 5/2015 | Kamata |
| 2012/0236614 A1 | 9/2012 | Kamata |
| 2014/0009969 A1* | 1/2014 | Yuzurihara ............ H02M 7/48 363/17 |
| 2014/0265911 A1 | 9/2014 | Kamata et al. |
| 2014/0268966 A1 | 9/2014 | Kamata |
| 2015/0200606 A1 | 7/2015 | Nunokawa et al. |

FOREIGN PATENT DOCUMENTS

| | | |
|---|---|---|
| JP | 2012-135112 | 7/2012 |
| JP | 2012-186984 | 9/2012 |
| JP | 2013-031338 | 2/2013 |

* cited by examiner

VOLTAGE RESONANT INVERTER, CONTROL METHOD, AND SURFACE TREATMENT DEVICE

CROSS-REFERENCE TO RELATED APPLICATIONS

The present application claims priority to and incorporates by reference the entire contents of Japanese Patent Application No. 2014-189491 filed in Japan on Sep. 17, 2014.

BACKGROUND OF THE INVENTION

1. Field of the Invention

The present invention relates to a voltage resonant inverter, a control method, and a surface treatment device.

2. Description of the Related Art

Inverters are used for supplying high voltage to various kinds of devices such as a discharge tube for a large-scale plasma display and a plasma generator. Inverters with output power of several watts are widely used, and inverters with alternating output having an output voltage of several kilovolts and electrical power of over several tens of watts are particularly used for plasma generators and other devices.

Examples of a power source device for supplying such kinds of devices with a high voltage include a high-voltage inverter described in Japanese Laid-open Patent Publication No. 2012-186984. As illustrated in FIG. 18, this kind of inverter has a step-up transformer T including a plurality of transformers T1 and T2 each having an independent core and a common characteristic. Such an inverter excites the step-up transformer T by switching an input voltage Vin with a switching element Q on which a control circuit performs on/off controls and simultaneously applying an excitation current to excitation windings Np1 and Np2, which are connected in parallel, of the respective transformers T1 and T2.

Output windings Ns1 and Ns2 of the respective transformers T1 and T2 are connected in series, and an output voltage Vout in an alternating high voltage where voltage waveforms induced by the output windings Ns1 and Ns2 are superimposed is output to a load. For example, a load such as an electrode of a plasma generator having load capacity Co is connected. Japanese Laid-open Patent Publication No. 2013-31338 describes such a technique that performs a pulse width modulation (PWM) control on a switching signal so as to make peak voltage values constant in an inverter with an alternating output having a peak voltage value of over ten kilovolts.

However, such an inverter outputting an alternating high voltage is a voltage resonant inverter in which voltage resonance is caused by inductance generated by an output winding and composite capacitance of stray capacitance or parasitic capacitance between windings and load capacitance in the secondary side of the step-up transformer. The voltage resonance generates a voltage in high-order attenuation waveform subsequent to a fundamental wave in a switching frequency, which accordingly generates a period (a time under an inhibiting condition) during which a switching element cannot be turned on. This configuration problematically limits a period for performing the PWM control, which accordingly prevents the inverter from performing a sufficient control to make peak values of the output voltage constant.

In view of the above, there is a need to considerably reduce time (a time under an inhibiting condition) in which a switching element cannot be turned on and extend control range for making peak values on the output voltage constant in a voltage resonant inverter as described above.

SUMMARY OF THE INVENTION

It is an object of the present invention to at least partially solve the problems in the conventional technology.

A voltage resonant inverter includes: a step-up transformer having an excitation winding and an output winding; and a first switching element that switches an input voltage and intermittently applying an excitation current to the excitation winding. Excitation energy stored in the step-up transformer during a period when the excitation current is applied causes a voltage resonant state in a secondary side of the step-up transformer during a period when the excitation current is shut off and generates an alternating output voltage on the output winding. The voltage resonant inverter further includes: a second resonant circuit that is provided in a primary side of the step-up transformer and enters a resonant state by a voltage generated at a connection point between the excitation winding and the first switching element when the excitation current is shut off, and includes a second switching element; a second diode that is provided between a frame ground and the second resonant circuit, and commutates a current resulting from energy returning to an input side in a region where the output voltage is negative after the second switching element is turned on so that the current is absorbed in the input voltage; and a second switching element control circuit that keeps the second switching element off while the second resonant circuit is in a resonant state, turns on the second switching element when the resonant state ends, and turns off the second switching element during a period after the first switching element is turned on until the first switching element is turned off.

A method controls a voltage resonant inverter that includes a step-up transformer having an excitation winding and an output winding and a first switching element switching an input voltage and intermittently applying an excitation current to the excitation winding, in which excitation energy stored in the step-up transformer during a period when the excitation current is applied causes a voltage resonant state in a secondary side of the step-up transformer during a period when the excitation current is shut off and generates an alternating output voltage on the output winding. The method includes: causing a second resonant circuit provided in a primary side of the step-up transformer to enter a resonant state with a voltage generated at a connection point between the excitation winding and the first switching element when the excitation current is shut off; keeping a second switching element provided to the second resonant circuit off during a resonant state of the second resonant circuit and turning on the second switching element when the resonant state ends; commutating current resulting from energy returning to an input side in a region where the output voltage is negative, with a second diode after the second switching element is turned on so that the current is absorbed in the input voltage; and turning off the second switching element during a period after the first switching element is turned on until the first switching element is turned off.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
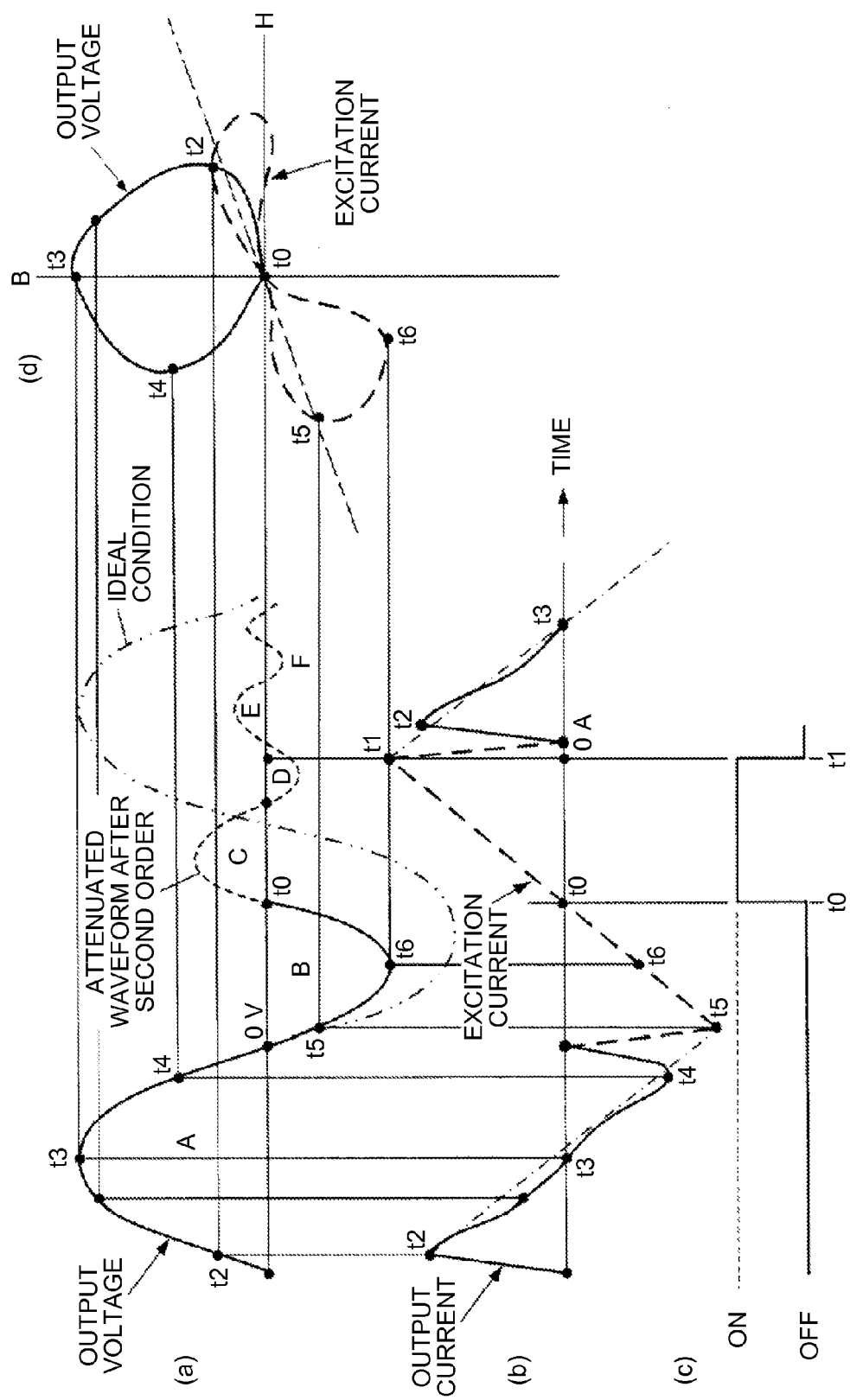
FIG. 1 is a line chart that illustrates, in relative values, an output voltage, an output current, and an excitation current of a step-up transformer of a voltage resonant inverter together with the on/off states of a switching element and a B-H loop.

An embodiment of the present invention will be described in detail with reference to the drawings. A voltage resonant inverter as an object of the present invention will now be described. Such a voltage resonant inverter illustrated in FIG. 18 generates an output voltage Vout alternating in high voltage from voltage resonance caused by inductance (Ls) of output windings Ns1 and Ns2 of a step-up transformer T and composite capacitance of static capacitance (Cs) distributed or parasitizing between the windings and load capacitance Co. Atmospheric-pressure plasma is generally generated under an ordinary pressure with six kilovolts or higher and is referred to as dielectric barrier discharge or silent discharge. The load between two electrodes has load capacitance Co of a passive element, and resonance constants in the above-described voltage resonant circuit are Ls, Cs, and Co.

A high magnetic field is generated on the electric path, whereby the resonance constants vary with, for example, temperature and a difference in the length between wires. The output voltage Vout is not formed only with a complete fundamental wave but is formed with an output waveform with distortion. Upon the Fourier transform, the output voltage Vout is decomposed into a voltage alternating in a high order and attenuating. The resonance constants Ls and Cs are composite characteristics of the transformers T1 and T2, which are a plurality of transformers with separate magnetic paths. In the case of two transformers, output inductance of each transformer is substantially (½) Ls whereas the static capacitance Cs (except the load capacitance Co) is substantially 2·Cs.

The output voltage is an alternating voltage having a value in the range of several kilovolts to several tens of kilovolts and mean output power in the range of several watts to several tens of kilowatts. In the case of a fundamental wave described as $Vout(t)=\sqrt{2}\ Vout\ sin(\omega t)$, the output voltage is on a function describing a sine wave. The Vout is an effective value of an output voltage value. In order to control a peak value of the alternating voltage, it is preferable to control the peak value without having a time lag.

With the inverter described in Japanese Laid-open Patent Publication No. 2013-31338, a voltage generated between the electrodes of a switching element or between both ends of an excitation winding of a step-up transformer serves as a monitoring voltage and, according to the fluctuation of the peak value, a PWM control is performed on a switching pulse having constant frequency. With this configuration, peak values of the output voltage are controlled to be substantially constant by controlling the ratio (the duty ratio) of the on-period of the switching element.

However, as described above, the output voltage of a voltage resonant inverter is not exclusively formed in a fundamental wave but is formed in a voltage waveform alternating in a high order and attenuating. Such a voltage in the attenuating waveform generates a period (a time under an inhibiting condition) in which the switching element cannot be turned on in switching frequency, which limits a period for performing the PWM control. This problem will now be described.

In a quite shorter time than $Vin(t)=Lp·i(t)/dt$ (LP is excitation inductance), a current Ip exciting a transformer becomes the derivative thereof, which accordingly satisfies: Ip∝Vin (Vin is an input voltage). With this relation, in the case of using two transformers, excitation energy ∈ stored in the two transformers (excitation inductance Lp of a transformer) is determined by a final value Id(Q) of the excitation current of the two transformers, which is: ∈=(½)·(Lp/2)·Id(Q)² . . . (1)

If the time from a start of turning on to turning off of the switching element (Q) is defined as a time Ton, the time Ton serves as derivative in a quiet small time axis, and the final value Id(Q) of the excitation current of the excitation winding satisfies: Id(Q)=(Vin/Lp)·Ton . . . (2). The formula: ∈=(¼)·Lp·(Vin·Ton/Lp)²=(Vin·Ton)²/4Lp . . . (3) is thus obtained by substituting the formula (2) for the formula (1). The formula (3) represents the amount of energy applied to the two transformers in a period.

If the step-up transformer includes n transformers, obtained is: ∈=(Vin·Ton)²/(2n·Lp) . . . (4). The output voltage changes depending on how much energy is stored in the transformer on the formula (4). If Ton is constant, the slope of the hypotenuse of the right angle is equal to Vin/Lp based on the formula (2).

The excitation inductance Lp exclusively depends on the linear portion of a direct current superimposition characteristic NI (N: the number of windings, I: the product of current). The excitation inductance Lp further depends on a voltage change per alternating time if the input voltage Vin is with an alternating current (AC) and further depends on voltage deviation if with a direct current (DC). In such a manner, the excitation current Ip determines the output power and voltage. If the input voltage Vin and the load are fixed, the excitation current Ip is forced to change according to the product of Vin and Ton.

Figure 18:
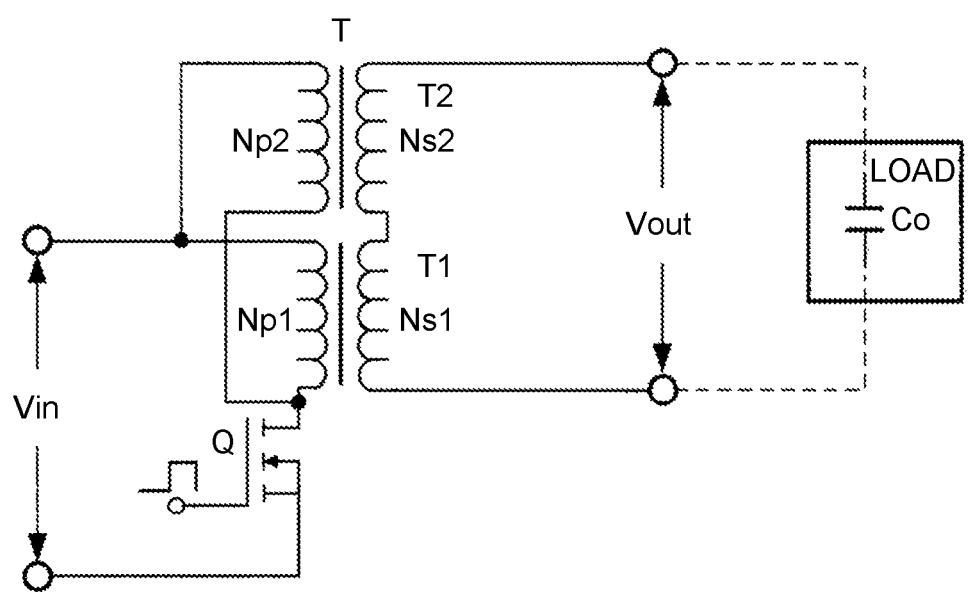
FIG. 18 is a circuit diagram that illustrates a main portion of an exemplary conventional voltage resonant inverter.

FIG. 1 is a line chart that illustrates, in relative values, an output voltage (Vout) of an inverter, for example, illustrated in FIG. 18, an output current flowing on a load, and the excitation current (Ip) of a step-up transformer together with the on/off states of a switching element Q and a B-H loop (a magnetic hysteresis loop). According to the Faraday's law, magnetic density B is proportional to the integral value of an applied voltage V(t), which accordingly satisfies: φ=B·S=(1/N)V(t)dt (φ: magnetic flux, B: magnetic flux density, S: cross-sectional area of a core, N: the number of windings of an excitation winding). In this formula, the B-H loop with the magnetic flux density B and the magnetic field strength H is relatively indicated as (d) in FIG. 1.

The output voltage in the output side of a step-up transformer is indicated in (a), the output current flowing on a load and the excitation current applying excitation energy to the step-up transformer are indicated in (b), and the on/off states of a switching element is indicated in (c). When the switching element is turned on at a time point t0 as indicated in (c) in FIG. 1, the excitation current linearly increases according to the input voltage based on the formula (2).

When the excitation current reaches predetermined On Duty (the on-time ratio) or Ton (the on-time) at the time point t1, the excitation current enters the region of Toff (the off-time) in which the switching element is turned off. Viewed from the input side, the current becomes 0 A, and the current appears to discontinuously flow. However, the output current actually flows at a time point t2 immediately. When the output voltage reaches the peak at a time point t3, the output current becomes 0 A.

The resonant state continues, and a state where the output current is negative is reached and a time point t4 is reached. When the output voltage becomes 0 V, the output current becomes 0 A. However, because the output voltage is in the resonant state, attenuated voltage is maintained. The amount of attenuation corresponds to the amount of resistance in the power consumed by the load. The transient voltage of the attenuated output is maintained during Toff after the region where the output voltage is negative is reached and returns to the input side whereas a region where the excitation current is negative is during the time from a time point t5 to t0 via t6.

Even if the switching element is turned on in the region B where the output voltage is negative, the direction of the excitation current (positive to zero) and the direction of the resonant current (negative to zero) are opposite to each other and thus offsets each other. No excitation energy is thus applied to the transformer. This process corresponds to the third quadrant of the B-H loop, and the excitation current flowing in reverse has no effects on the transformer as excitation energy until the current returns to the time point t0. The above-described formula (4) is not satisfied in this period, and the region B where the output voltage is negative is reached. When Toff is further continued, the transient voltage is continued, and the region C where the output voltage is positive is reached.

Figure 2:
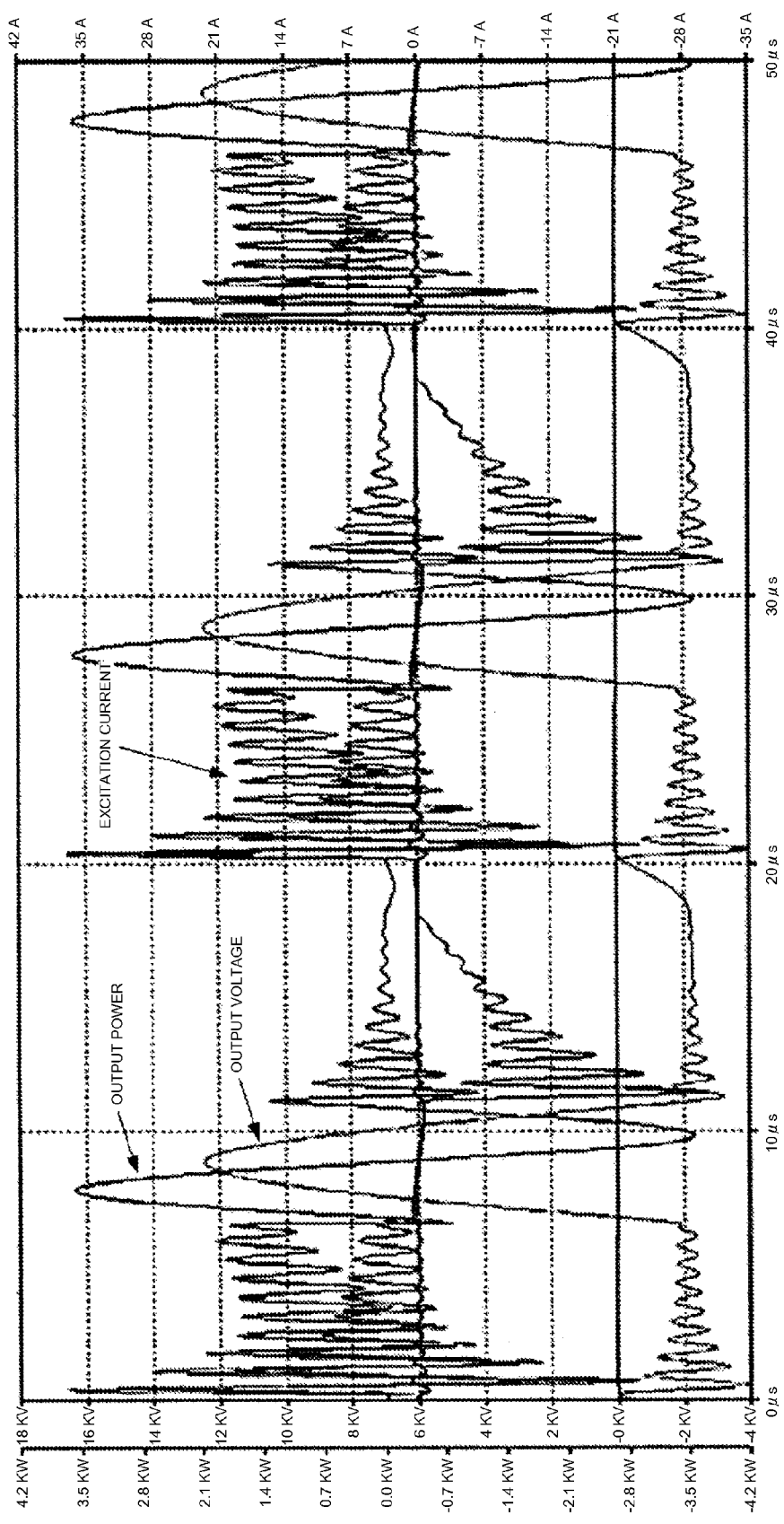
FIG. 2 is a timing chart and a waveform chart that illustrates a result of observing changes of output power, an output voltage, and an excitation current when the switching element is turned on in a region C or E where a positive output voltage is supplied in FIG. 1.

If the switching element is turned on in the region C, a short circuit occurs with the output voltage still existing. This operation generates an excessive current, and the amount of the current causes saturation of the transformer. The above-described formula (2) thus becomes inapplicable to the excitation current of the transformer. If the switching element is turned on in the region C or E where the output voltage is positive, the voltage causes a short circuit. The excitation current turns to the excessive current as illustrated in FIG. 2, which generates a repeated ringing current. Consequently, the excitation energy applied to the transformer cannot be formed in linear.

Figure 3:
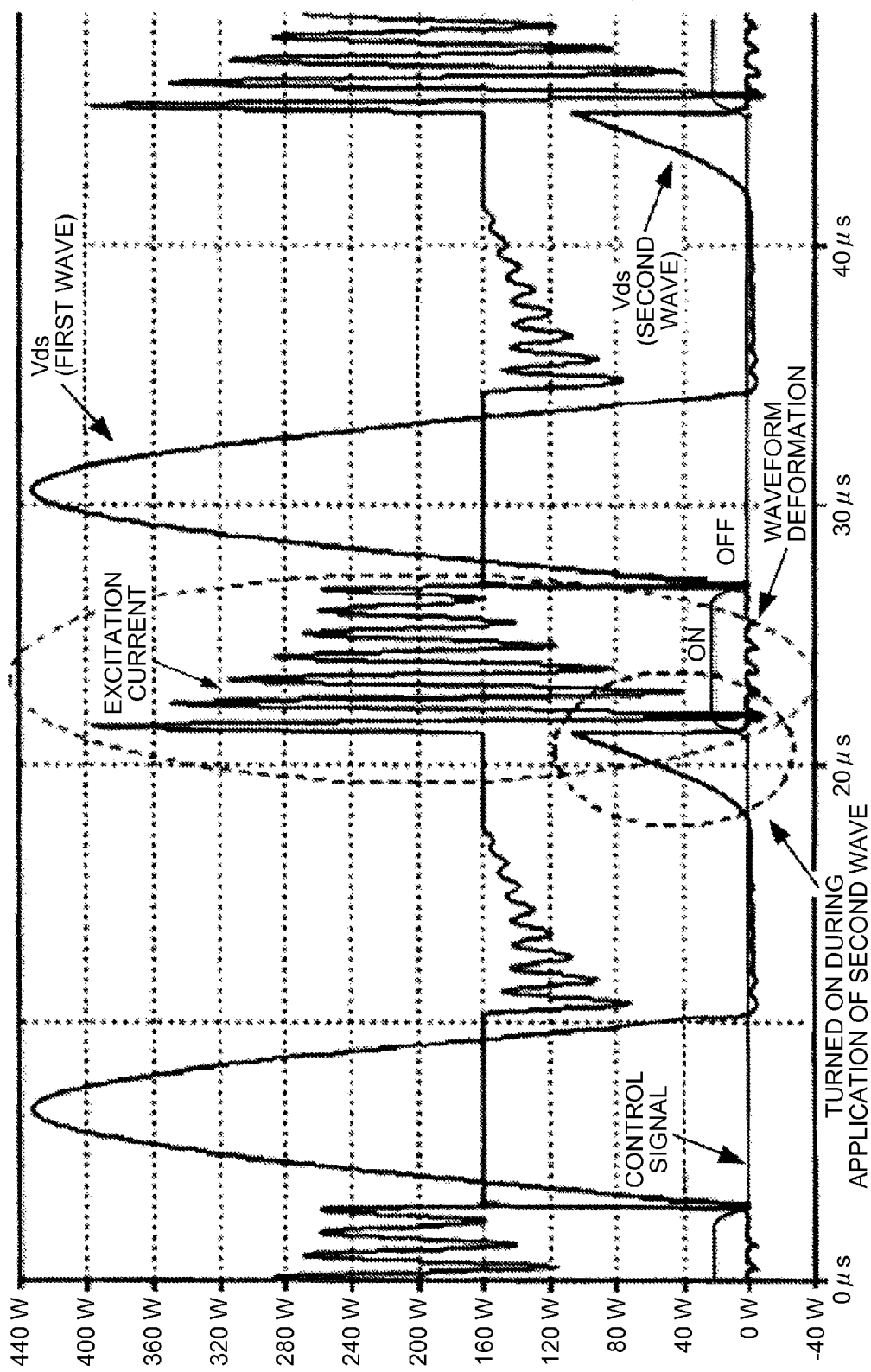
FIG. 3 is a timing chart and a waveform chart that illustrates a result of observing changes of a drain-source voltage (Vds) of the switching element and the excitation current on and near zero volts in FIG. 2.

FIG. 3 illustrates an area on and near zero volts in FIG. 2 with the excitation current and a drain-source voltage (Vds) of the switching element as a replacement of the output voltage with a smaller voltage range. As indicated in the area circled with a dashed line, the ringing excitation current repeats. This phenomenon is caused by turning on the switching element while the output voltage (indicated as Vds in FIG. 3) is applying a secondary wave. The period in which the output voltage is positive in the regions C and E in FIG. 1 is a period in which the switching element cannot be turned on. The regions B, D, and F where the output voltage is negative are regions where no excitation energy is stored in the transformer even when the switching element is turned on.

Specifically, the region B including the time points t5, t6, and t0 in FIG. 1 is an inhibiting condition (which means that the region is unusable) in controlling the output voltage. In an ideal resonant state, lossless exchange of energy is repeatedly performed between the input and output without having an end. The output voltage waveform under such an ideal condition is indicated with a double dotted dashed line in FIG. 1. However, actually, a dielectric loss of a load such as electric discharge generating, for example, heat, light, plasma, and sound gradually changes the output voltage to an attenuated wave.

Furthermore, from comprehensive and relative viewpoints, the output current and the excitation current, which appear discontinuous, each are an actually continuous current in a continuous substantially triangle wave as indicated with a dotted dashed line and a bold dashed line in FIG. 1. As described above, exchange of energy occurs between the input and the output of the transformer in a resonant state. In such a state, Ton is effective only in the part from the time point t0 to t1. The region B from the time point t5 to t0 via t6 is a part inevitably generated as a result of resonance and is unnecessary in controlling Ton. If energy is 100 percent consumed in the region A, the region B is not generated.

Energy exciting the transformer by turning on the switching element corresponds to the hypotenuse of the right triangle extending from the time point t0 to t1 in FIG. 1, which is indicated in the first quadrant of the B-H loop. After a period, the trajectory of the B-H loop needs to return to a start point (the time point t0), that is, B=0 and H=0 should be satisfied. According to the Faraday's law, B=Br (residual magnetic flux) means that a voltage still exists when the switching element is turned on, and a precipitous current thus flows.

A period ends after passing the second and the third quadrants of the B-H loop with resonance and the next period starts. The slope when exciting a transformer is represented in the formula (2). On the B-H loop, by a resonant voltage, the excitation current moves on the trajectory of a circle according to a change on a sine wave of the magnetic flux density B. In the case of a rectangular wave, the current moves on the magnetic permeability $\mu = \Delta B/\Delta H$ in the region except saturation, which is indicated with a dotted dash line in (d) of FIG. 1.

The present invention is made based on analytical results and has an intention to decrease a part (the part from the time point t5 to t0 via t6) corresponding to returning to the input in exchange of resonant energy in FIG. 1. This process accordingly decreases the returning to positive in the regions C and E, makes the output voltage in the regions close to zero potential, and extends the range for performing the pulse width modulation (PWM) control. This structure facilitates controlling a peak value (a peak voltage) of the output voltage in a desired value.

Specifically, as described in a later-described embodiment, a second resonant circuit is provided in the primary side of the step-up transformer, and the output voltage is made to be substantially zero volts in the regions C and E in FIG. 1. Energy of the output voltage returning to the input side in a region where the output voltage is negative is absorbed in the input voltage. This process reduces an uncontrollable inhibited time as much as possible and has excitation energy applied to the step-up transformer at whichever time point included in the regions C, D, E, and F of FIG. 1 the switching element is turn on. Furthermore, this process prevents the excitation current from flowing as an excessive ringing current and avoids saturation of the transformer. The structure is represented by the formula (3), and a PWM or a pulse frequency modulation (PFM) controllable status is achieved in a wider range.

DESCRIPTION OF EMBODIMENTS

The structure and the operation of a voltage resonant inverter in each embodiment according to the present invention will now be described.

First Embodiment

Figure 4:
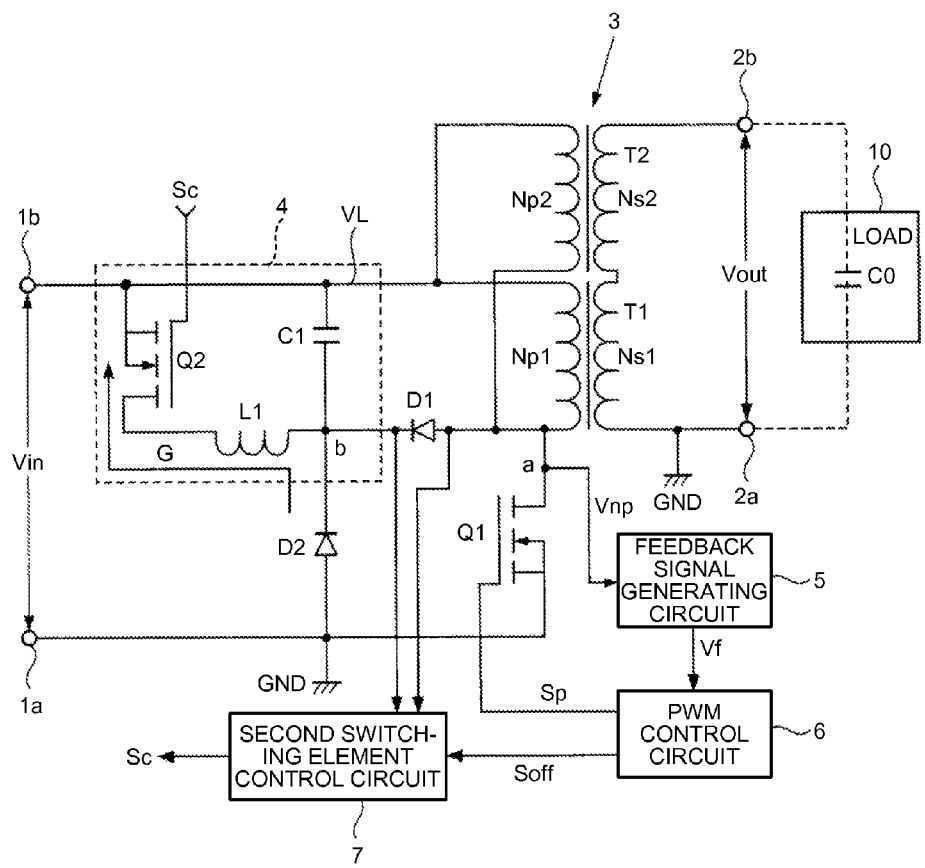
FIG. 4 is a circuit diagram that illustrates a configuration of a voltage resonant inverter in a first embodiment according to the present invention.

FIG. 4 is a circuit diagram that illustrates the configuration of a voltage resonant inverter in a first embodiment according to the present invention. Similarly with the earlier-described conventional example, the voltage resonant inverter has a step-up transformer 3 including a plurality of transformers T1 and T2 each having an independent core and a common characteristic. The transformers T1 and T2 have, respectively, excitation windings Np1 and Np2 in the primary side and output windings Ns1 and Ns2 in the secondary side.

The excitation windings Np1 and Np2 are connected in parallel with each other, connected in series with a first switching element Q1, and further connected with input terminals 1a and 1b through, respectively, a frame ground GND and a power wire VL. In this example, an N-channel FET is used as the first switching element Q1. The output windings Ns1 and Ns2 are connected in series with each other and have the ends connected with output terminals 2a and 2b, respectively, through output wires. The output terminal 2a is connected with a frame ground GND.

A switching signal Sp from a PWM control circuit 6 performs on/off controls on the first switching element Q1. The on/off operation of the first switching element Q1 switches the input voltage Vin supplied from input terminals 1a and 1b, and an intermittent excitation current is simultaneously supplied to the excitation windings Np1 and Np2 of the transformers T1 and T2.

Excitation energy is stored in the transformers T1 and T2 of the step-up transformer 3 in a period in which the excitation current flows through the excitation windings Np1 and Np2. During a period in which the excitation current is shut off, the secondary side of the step-up transformer 3 enters a voltage resonant state, which generates an alternating output voltage Vout on the output windings Ns1 and Ns2, which are connected in series with each other, of the transformers T1 and T2. The output voltage Vout is applied to a load 10 from the output terminals 2a and 2b.

The voltage resonance is caused by inductance (Ls) of the output windings Ns1 and Ns2 in the secondary side of the step-up transformer 3 and composite capacitance (static capacitance) of stray capacitance or parasitic capacitance (Cs) between the windings and load capacitance Co between, for example, the electrodes of the load 10 such as a plasma generator. The voltage waveforms induced by the output windings Ns1 and Ns2 of the transformers T1 and T2 have a synchronized time axis, thereby obtaining the output voltage Vout having about twice a peak value as a result of superimposition of the voltage waveforms.

The voltage resonant inverter has a second resonant circuit 4 including a second switching element Q2 in the primary side of the step-up transformer 3. An N-channel FET is also used for the second switching element Q2. When the excitation current of the transformers T1 and T2 is shut off, a voltage generated at a connection point a between the excitation windings Np1 and Np2 connected in parallel with each other and a drain terminal of the first switching element Q1 is applied to the second resonant circuit 4 through a diode D1, whereby the second resonant circuit 4 is in a resonant state.

Between the frame ground GND and the second resonant circuit 4, a second diode D2 that commutates current resulting from energy returning to the input side in the region where the output voltage Vout is negative so that the current is absorbed in the input voltage Vin when the second switching element Q2 is turned on, is provided.

Furthermore, a second switching element control circuit 7 is provided that keeps the second switching element Q2 off while the second resonant circuit 4 is in a resonant state, turns on the second switching element Q2 when the resonant state ends, and turns off the second switching element Q2 during a time of turning on to turning off of the first switching element Q1.

The voltage resonant inverter is further provided with a feedback signal generating circuit 5 for detecting a peak value of the output voltage Vout and generating a feedback signal Vf and a pulse width modulation (PWM) control circuit 6 for controlling the duty ratio of a switching signal Sp turning on and off the first switching element Q1 in a predetermined period according the feedback signal. The feedback signal generating circuit 5 monitors a voltage Vnp generated at the connection point a between the excitation windings Np1 and Np2 and the drain terminal of the first switching element Q1 and detects a peak value of the output voltage Vout. Examples of the second switching element control circuit 7 and the feedback signal generating circuit 5 will be described later.

In the first embodiment, the first diode D1 is provided that connects the anode to the connection point a between ends of the excitation windings Np1 and Np2 and the first switching element Q1. A capacitor C1 is connected between the cathode of the first diode D1 and the power wire VL supplying the input voltage Vin to the other ends of the excitation windings Np1 and Np2. The second resonant circuit 4 includes the capacitor C1, an inductor L1 an end of which is connected to the cathode of the first diode D1, and the second switching element Q2 connected between the other end of the inductor L1 and the power wire VL. A second diode D2 connects the anode to the frame ground GND and connects the cathode to a connection point b between the capacitor C1 and the end of the inductor L1.

According to the embodiment, the output capacitance of the second switching element Q2, the capacitor C1, and the inductor L1 make the second resonant circuit 4 in a voltage and current resonant state during an output voltage generating time in which the first switching element Q1 is changed from an on state to an off state and the excitation current of the transformers T1 and T2 is shut off. This process prevents generation of a high-order voltage in the secondary side of the step-up transformer 3. The second switching element Q2 is kept off during the resonant state.

When a region A of the output voltage Vout in FIG. 1 ends, the voltage at the connection point becomes 0 V, and the first diode D1 accordingly becomes electrically discontinuous. A current flowing into the second resonant circuit 4 and a voltage between circuits disappear, and the resonance accordingly ends. If the resonance still continues, the second switching element control circuit 7 detects that the resonant state of the second resonant circuit 4 has ended and turns on the second switching element Q2. A part of the energy having returned to the input side in the region B of FIG. 1 is absorbed (regenerated) in the input voltage Vin through the second diode D2 as indicated by the arrow G, and the voltage is clamped at the level.

This process is continued all through the time in which the second switching element Q2 is kept on so that the potential of the cathode of the second diode D2 is substantially equal to the input voltage Vin, and a large amount of energy generated by the output voltage returning to the input side is thus absorbed (regenerated) in the input voltage Vin. It is thus preferable that the second switching element Q2 be turned on during the time in which the output voltage is continued and transient voltage is generated. The second switching element Q2 may be turned off during the time of turning on to turning off of the first switching element Q1. The second switching element Q2 may be turned off at the same time of turning off of the first switching element Q1.

At least under such a condition where the first switching element has been turned on and the excitation current is linearly increasing, the second switching element Q2 is not necessary to be kept in the on state. In order to prevent a ringing excitation current, the on-time of the second switching element Q2 needs to be set minimum, which means that quite a short time passes from turning on of the first switching element Q1 till turning on of the second switching element Q2.

Second to Fourth Embodiments

Figure 5:
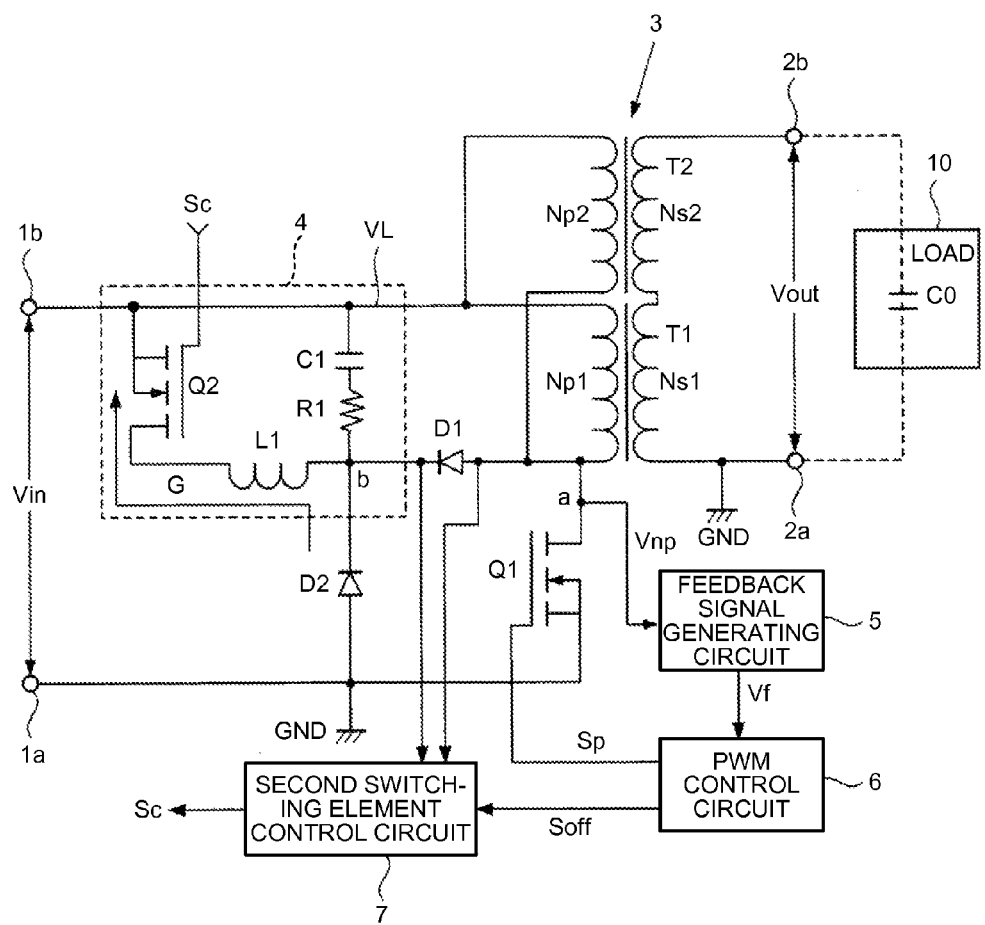
FIG. 5 is a circuit diagram that illustrates a configuration of a voltage resonant inverter in a second embodiment according to the present invention.

FIG. 5 is a circuit diagram of a voltage resonant inverter in a second embodiment according to the present invention. In FIG. 5, parts identical or corresponding to the parts of the first embodiment in FIG. 4 are indicated by like numerals, and description about those parts will be omitted. Other embodiments in FIGS. 6, 7, 9, and 10 will be described in this manner.

The only difference between the first embodiment illustrated in FIG. 4 and the second embodiment illustrated in FIG. 5 is that a resistance R1 is arranged, in series with the capacitor C1 included in the second resonant circuit 4, between the capacitor C1 and the connection point b connecting the capacitor C1 and an end of the inductor L1. The resistance R1 is provided to reduce an inrush current generated when the second switching element Q2 is turned on.

Figure 6:
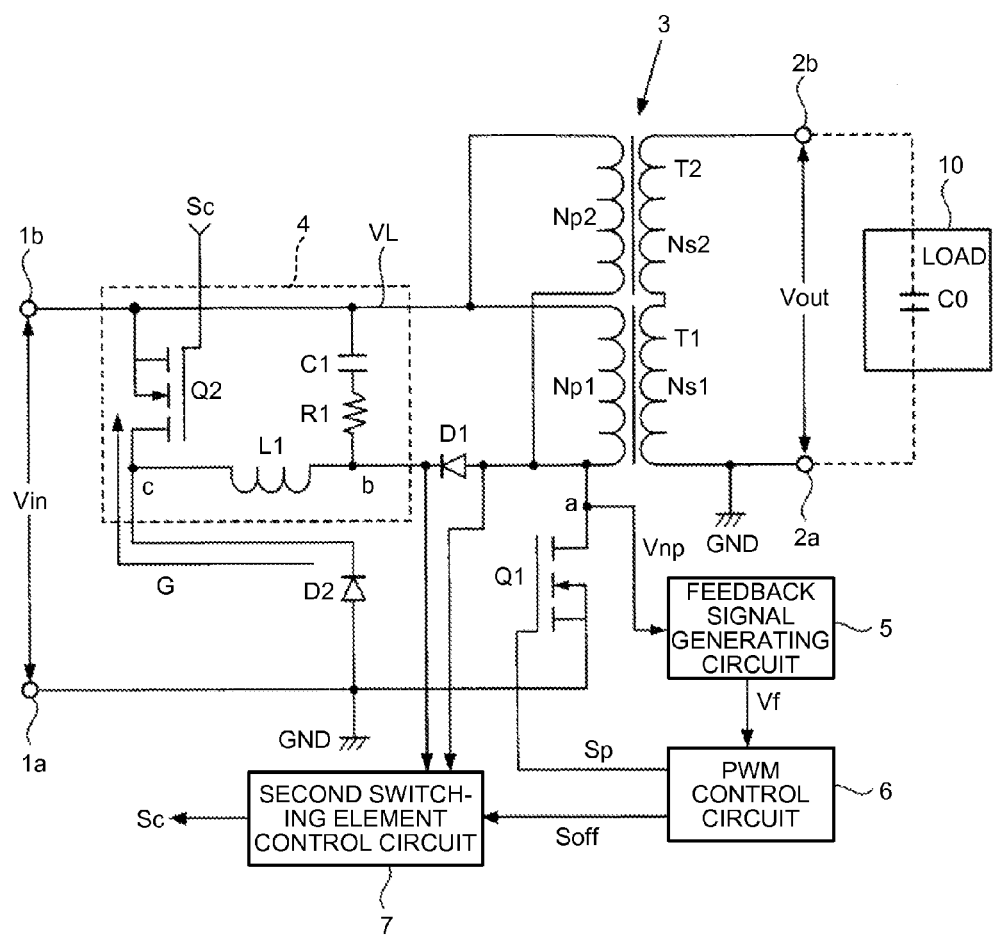
FIG. 6 is a circuit diagram that illustrates a configuration of a voltage resonant inverter in a third embodiment according to the present invention.

FIG. 6 is a circuit diagram of a voltage resonant inverter in a third embodiment according to the present invention. The only difference between the second embodiment illustrated in FIG. 5 and the third embodiment is that the cathode of the second diode D2 is connected to a connection point c connecting the inductor L1 and the drain terminal of the second switching element Q2. In this embodiment, a part of the energy returning to the input side after the second switching element Q2 is turned on is absorbed (regenerated) in the input voltage Vin without passing through the inductor L1 but through the second diode D2 as indicated by the arrow G, and the voltage is clamped at the level.

Figure 7:
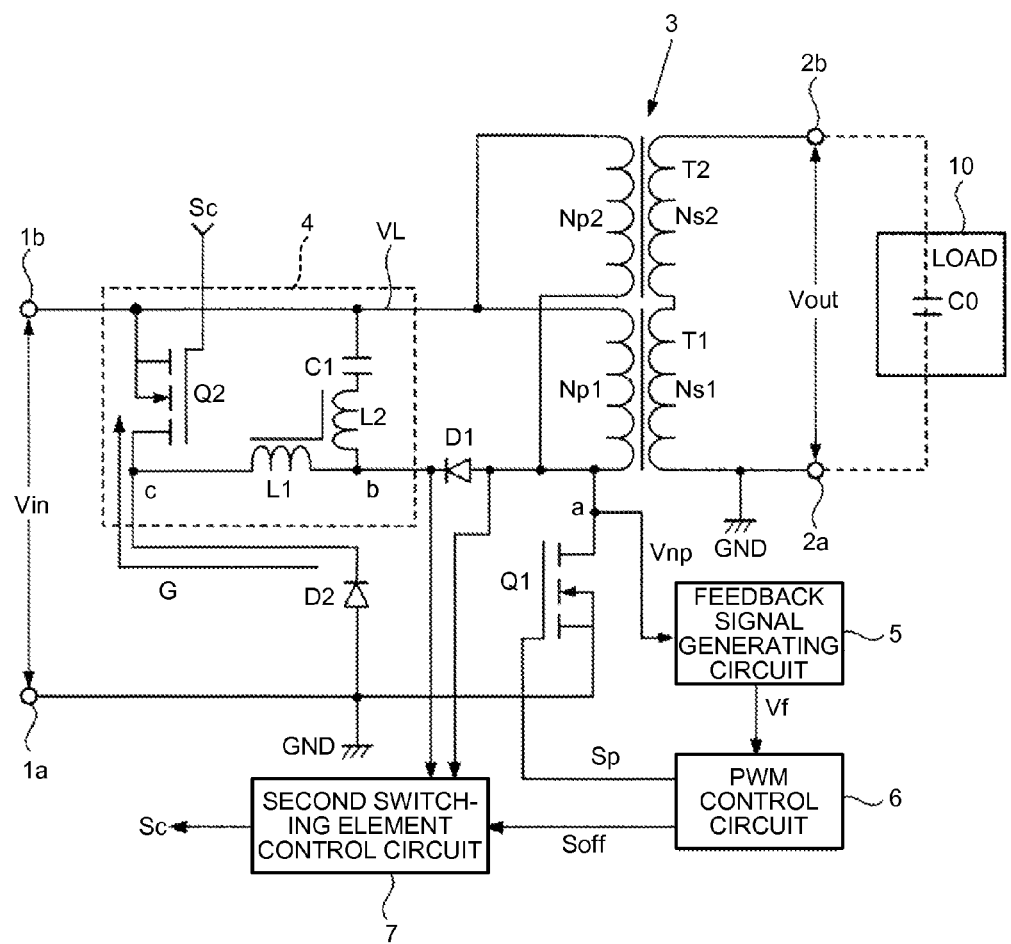
FIG. 7 is a circuit diagram that illustrates a configuration of a voltage resonant inverter in a fourth embodiment according to the present invention.

FIG. 7 is a circuit diagram of a voltage resonant inverter in a fourth embodiment according to the present invention. The only difference between the third embodiment illustrated in FIG. 6 and the fourth embodiment is that a second inductor L2 instead of the resistance R1 is provided in series with the capacitor C1 in the second resonant circuit 4. The inductor L1 and the second inductor L2 share a core. In this embodiment, the impedance in the capacitor C1 side is increased by the second inductor L2 when charging the capacitor C1, thereby reducing a making current.

Examples of Second Switching Element Control Circuit and Feedback Signal Generating Circuit Examples of the second switching element control circuit 7 and the feedback signal generating circuit 5 in each embodiment as described above will now be described with reference to FIG. 8. The second switching element control circuit 7 illustrated in FIG. 8 has a photocoupler PC connecting a light-emitting element LED to the first diode D1 in parallel.

A light-receiving element PT of the photocoupler PC applies a DC voltage VAA to its collector and connects its emitter to a frame ground through a series circuit of resistances R5 and R6. The voltage Vd at a connection point d between the resistances R5 and R6 is input to the inverting input terminal of a comparison circuit (comparator) 9. A comparison voltage Vr2 supplied from a DC power supply E2 is input to the non-inverting input terminal of the comparison circuit 9.

The output of the comparison circuit 9 is applied to the base of a PNP switching transistor TR1 through a resistance R7. The DC voltage VAA is applied to the emitter of the switching transistor TR1 through a series circuit of resistances R8 and R9, and the collector is connected to a frame ground. An NPN switching transistor TR2 is connected between the emitter and the collector of the switching transistor TR1, and a signal Soff, which is usually a low level signal, transmitted from the PWM control circuit 6 illustrated in FIGS. 4 to 7 is applied to the base of the switching transistor TR2. The switching transistor TR2 is thus usually kept off.

The operation of the second switching element control circuit 7 will be described. The first diode D1 is electrically continuous in forward bias during a resonant state of the second resonant circuit 4. A current thus flows through the light-emitting element LED of the photocoupler PC, whereby the light-emitting element LED emits light. The light-receiving element PT of the photocoupler PC receives the light and becomes electrically continuous. The voltage Vd at the connection point d, at which the DC voltage VAA is divided by the resistances R5 and R6, is input to the inverting input terminal of the comparison circuit 9. The voltage Vd is set higher than a comparison voltage Vr2, whereby the output of the comparison circuit 9 is in a low level, the switching transistor TR1 is kept on, and the potential of a connection point e between the resistances R8 and R9 is in a low level. The potential is applied to the gate terminal of the second switching element Q2 illustrated in FIGS. 4 to 7 as a control signal Sc; however, the second switching element Q2 is kept off because the potential is still in a low level.

When the resonant state of the second resonant circuit 4 ends, the first diode D1 is connected in reverse bias and accordingly becomes electrically discontinuous. No current flows into the light-emitting element LED of the photocoupler PC, which stops the LED emitting light. The light-receiving element PT of the photocoupler PC becomes non-conductive, and the DC voltage VAA is shut off. The voltage Vd at the connection point d between the resistances R5 and R6 is decreased to the ground level, which is lower than the comparison voltage Vr2. The output of the comparison circuit 9 is increased to a high level and turns off the switching transistor TR1. The potential at the connection point e between the resistances R8 and R9 is increased to a high level by the DC voltage VAA and is applied to the gate terminal of the second switching element Q2 illustrated in FIGS. 4 to 7 as the control signal sc. The second switching element Q2 is accordingly turned on.

The PWM control circuit 6 illustrated in FIGS. 4 to 7 changes the signal Soff to a high level from when the first switching element Q1 is turned on till turned off by the switching signal Sp applied to the gate terminal of the first switching element Q1. The switching transistor Tr2 is turned on, and the potential at the connection point e between the resistances R8 and R9 is decreased to a low level. The signal Sc is accordingly changed to a low level, which turns off the second switching element Q2. The second switching element control circuit 7 is not limited to this configuration, and various changes can be made.

Figure 8:
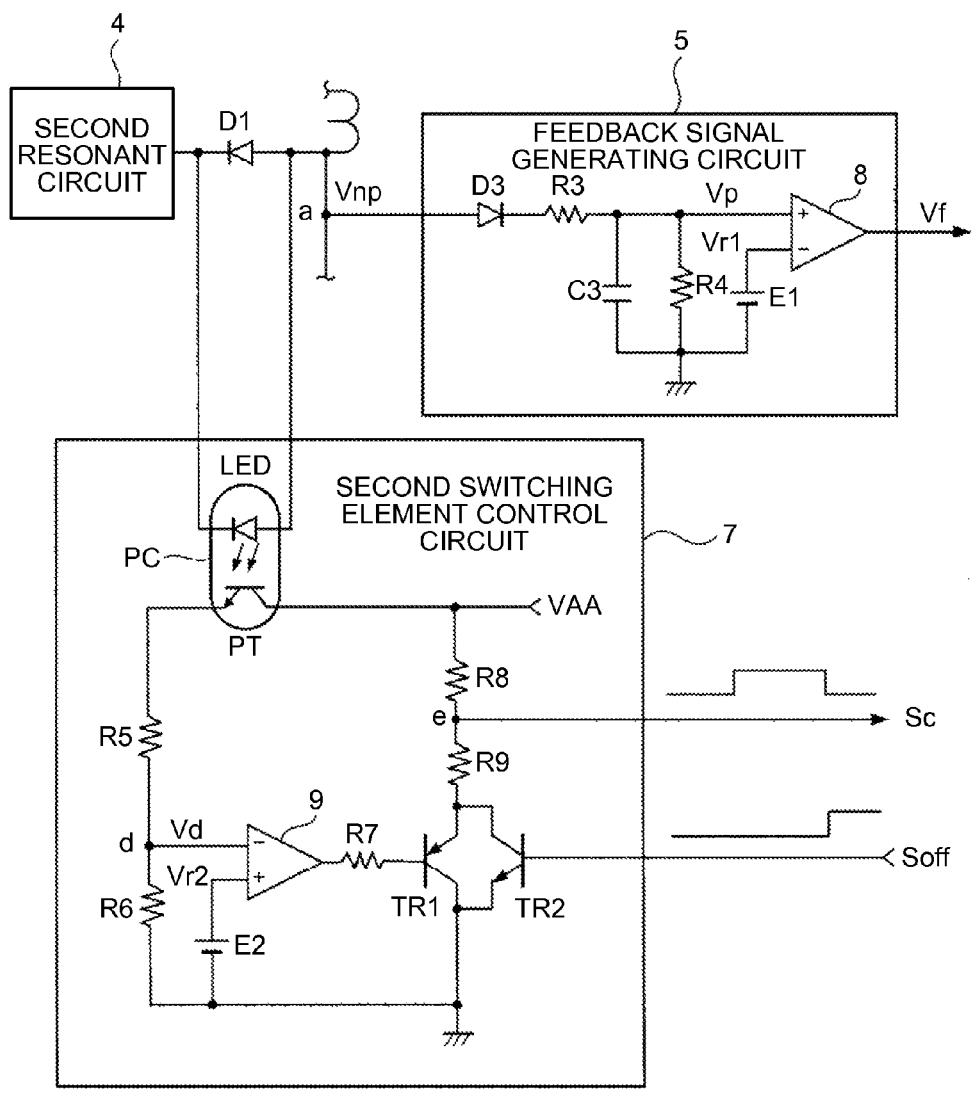
FIG. 8 is a circuit diagram that illustrates detailed examples of a feedback signal generating circuit and a second switching element control circuit in each of the embodiments.

The feedback signal generating circuit 5 illustrated in FIG. 8 monitors the voltage Vnp generated at the connection point a between respective ends of the excitation windings Np1 and Np2, which are connected in parallel with each other, of the transformer T1 and T2 illustrated in FIGS. 4 to 7 and the drain terminal of the first switching element Q1. The voltage Vnp has the same frequency and an approximate waveform as those of the output voltage Vout in the secondary side of the step-up transformer 3, whereby a pseudo output voltage with a peak value (for example, ten volts to several tens of volts order) of a hundredth to a thousandth or less can be obtained.

The voltage Vnp is half-wave rectified with the diode D3 and the resultant voltage is smoothed with the capacitor C3 and the resistances R3 and R4 so as to have a certain charging-discharging time constant, whereby a voltage Vp corresponding to the output voltage Vout in peak values is generated. A differential amplifier 8 compares the voltage Vp with a comparison voltage Vr1 resulting from a DC power supply E1. A feedback signal Vf corresponding to the difference (Vp−Vr1 including polarity in the magnitude relation) is generated and input to the PWM control circuit 6. The PWM control circuit 6 changes the duty ratio of the switching signal Sp so as to set the feedback signal Vf at zero, thereby controlling the on-period of the first switching element Q1.

Such a process can be applied to various levels of a peak value of the output voltage by making a comparison voltage Vr1 variable. The feedback signal generating circuit 5 is not limited to this configuration and can be changed in various manners. For example, the configuration may be the same as that of the output voltage control circuit described in Japanese Laid-open Patent Publication No. 2013-31338. A tertiary winding or an assistant winding may be provided to a step-up transformer for monitoring the voltage induced by the winding as a pseudo output voltage.

Other Embodiments

Figure 9:
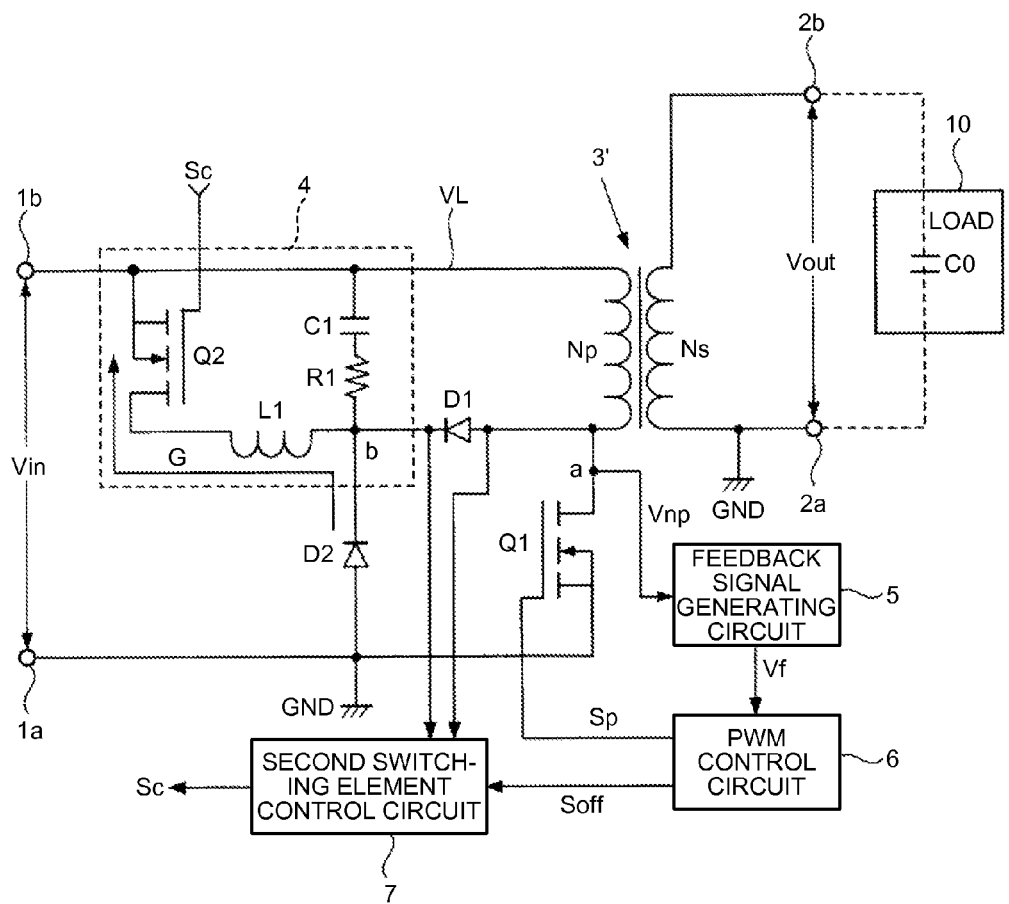
FIG. 9 is a circuit diagram that illustrates a configuration of a voltage resonant inverter in another embodiment according to the present invention.

The voltage resonant inverter in each of the above-described first to fourth embodiments has a step-up transformer including independent two transformers T1 and T2; however, the embodiments are not limited thereto. The step-up transformer can include any number of transformers according to a necessary output voltage. In any cases, it is preferable that excitation windings of the respective transformers be connected in parallel and the output windings be connected in series. The step-up transformer may include a single transformer. FIG. 9 illustrates such a circuit diagram of an embodiment. This embodiment differs from the second embodiment illustrated in FIG. 5 only in that a step-up transformer 3' includes a single transformer having an excitation winding Np and an output winding Ns. The embodiment may have the same configuration as that described in any of the first to the fourth embodiments.

Figure 10:
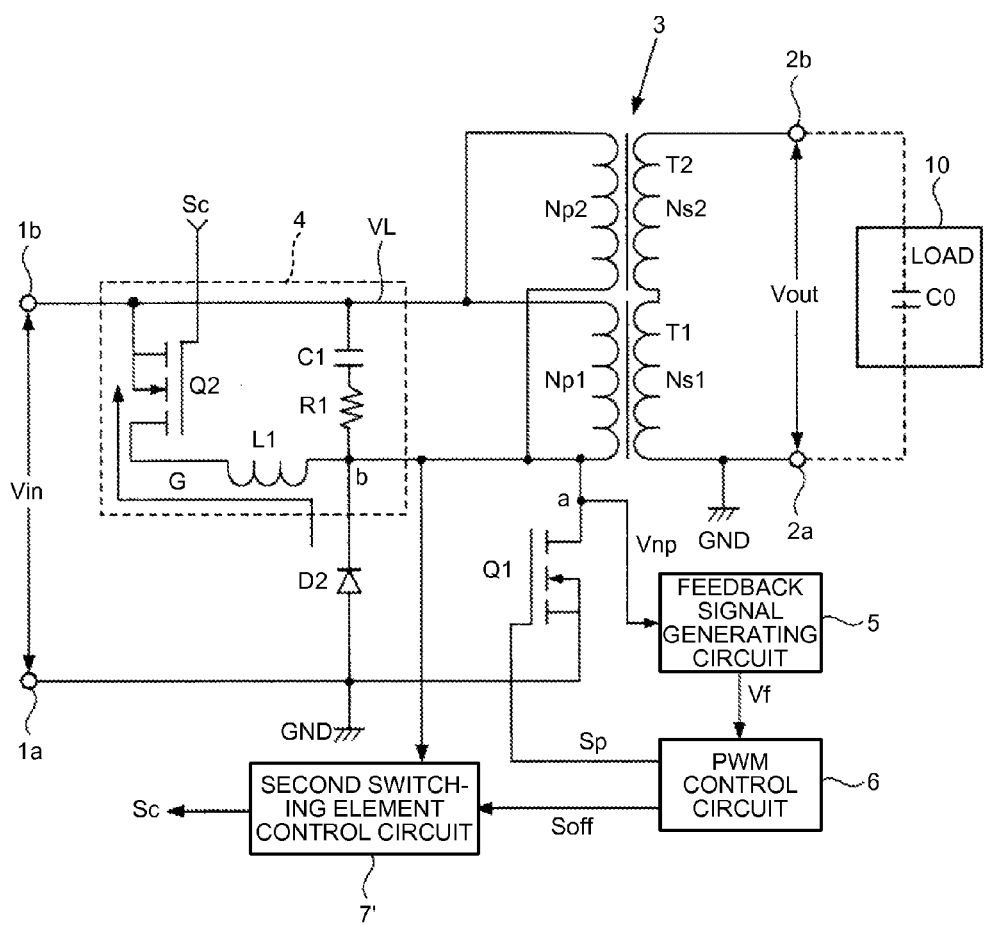
FIG. 10 is a circuit diagram that illustrates a configuration of a voltage resonant inverter in still another embodiment according to the present invention.

The connection points a and b may be directly connected by removing the first diode D1 in each of the above-described embodiments. FIG. 10 illustrates such a circuit diagram of an embodiment. This embodiment differs from the second embodiment illustrated in FIG. 5 only in that the first diode D1 is removed and the connection points a and b are electrically connected with each other. The embodiment may have the same configuration as that described in any of the first to the fourth embodiments.

In this case, a second switching element control circuit 7' cannot detect completion of the resonant state of the second resonant circuit 4 based on a change in the potential difference of the first diode D1. The second switching element control circuit 7' therefore detects the completion based on a change in the potential of the connection point a (the connection point b has the same potential). The second switching element control circuit 7' controls the second switching element Q2 in such a manner that turns off the second switching element Q2 at the same time as turning on of the first switching element Q1. The on-period of the first switching element and the on-period of the second switching element Q2 therefore cannot be overlapped with each other.

Description with Reference to Timing Chart and Waveform Diagram

The operation of the voltage resonant inverter in each of the above-described first to fourth embodiments will now be described with reference to timing charts and waveform diagrams of FIGS. 11 to 17. With the voltage resonant inverter in each of the above-described embodiments, a resonant voltage based on the output voltage Vout is generated at the connection point a during an output voltage generating period in which the first switching element Q1 is kept off. The voltage is applied to the second resonant circuit 4 through the first diode D1, whereby the second resonant circuit 4 enters a resonant state. At the same time, energy excited in the secondary side of the step-up transformer 3 is added to the load 10 having the load capacitance Co.

Because the charge in the capacitor C1 of the second resonant circuit 4 is empty (there are no potential differences because the amounts of positive and negative charges are equal), a current flowing into the capacitor C1 with the cathode side of the first diode D1 as the positive electrode increases as the output voltage increases, which results in an increase of the voltage between electrodes. The second switching element Q2 is kept off under the resonant state of the second resonant circuit 4. With the output capacitance Coss added thereto, such resonance occurs where parallel resonance and series resonance are combined.

Figure 11:
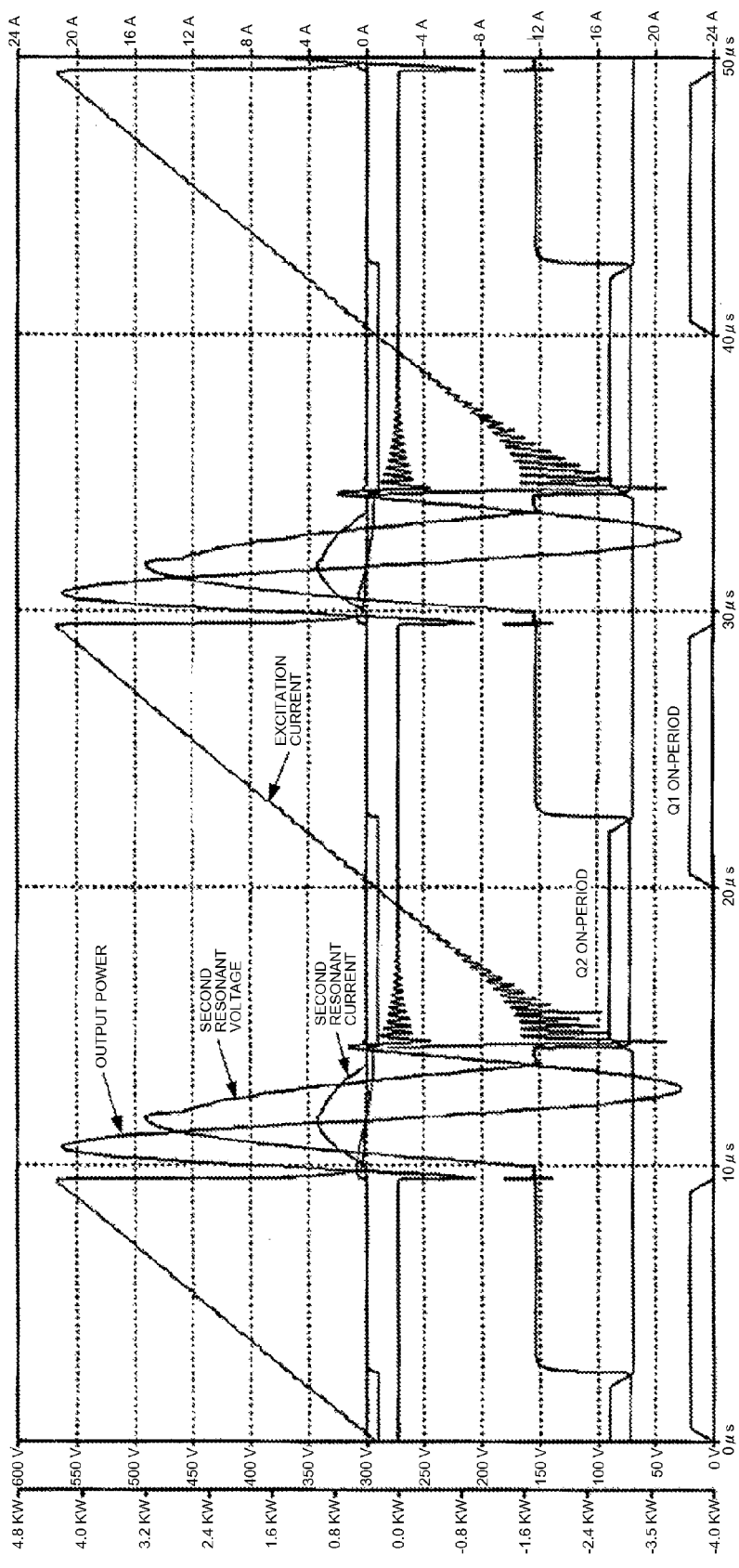
FIG. 11 is a timing chart and a waveform chart that illustrates a result of observing an operation status when a first switching element has a maximum on-period (Ton) in the second embodiment.

FIG. 11 is a timing chart and a waveform chart that illustrates a result of observing the operation status when the first switching element Q1 has a maximum on-period (Ton). FIG. 11 illustrates the excitation current of the step-up transformer 3, the output voltage, a second resonant voltage (with the cathode side of the first diode D1 serving as the positive electrode), and a current (second resonant current) flowing into the second switching element Q2. The voltage and the current are in a series and parallel resonant status. The voltage between terminals of the capacitor C1 is charged and discharged according to the amount of change in the output voltage, and the resonance (in a half period) is completed a little before the output voltage disappears.

Figure 12:
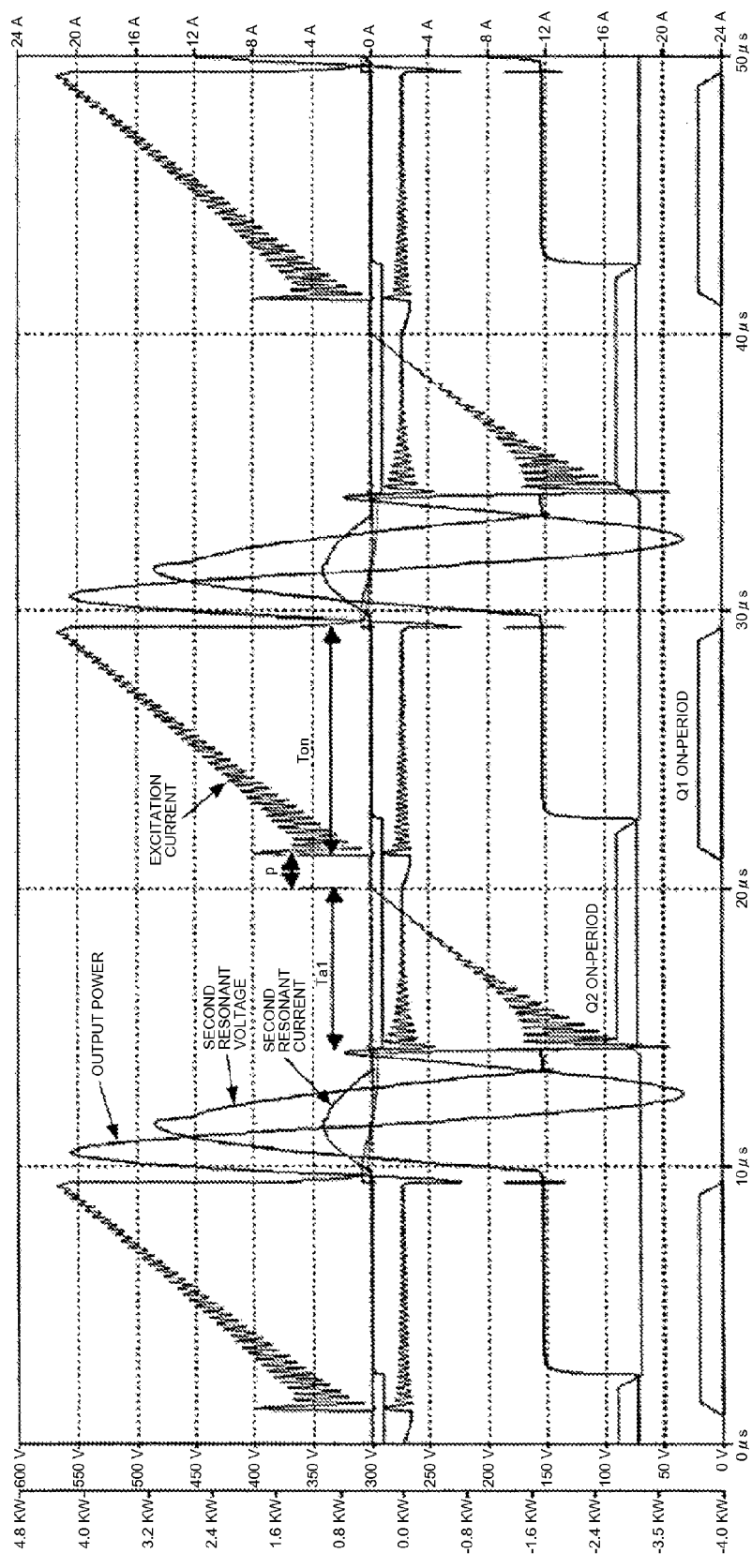
FIG. 12 is another similar timing chart and waveform chart that illustrates an example where an uncontrollable inhibited period Ta1 is decreased.

As a result of this process, the capacitor C1 returns to the state with empty charge (no potential differences because the amounts of positive and negative charges are equal) without effecting on the resonant state of the output voltage. The resonant state of the second resonant circuit 4 is illustrated in FIG. 12. When the output voltage returns to the level at the time point t0 in FIG. 1 (the output voltage is zero volts), the charge in the capacitor C1 is charged in a one-way direction, and the voltage of the capacitor C1 is not increased even if a higher voltage is applied thereto. Under the condition, the resonant state of the output voltage has no effects to shorten the time of inhibiting condition (an uncontrollable time) Ta1 with respect to the excitation time Ton. Furthermore, an excessive excitation current is generated if the timing to start turning on the first switching element Q1 is in the region C of FIG. 1.

When the region B is reached (after a part where the output voltage is positive ends) of FIG. 1, the second switching element Q2 is turned on. FIG. 11 illustrates a status observed with the input voltage set as Vin=70 V (DC). Energy in the second resonant circuit 4 is regenerated into the input voltage Vin by the second diode D2 as indicated by the arrow G. The voltage between terminals of the capacitor C1 is clamped at the input voltage Vin.

This operation decreases the absolute potential between terminals (the potential between electrodes is zero) of the capacitor C1 and the potential between the cathode of the first diode D1 and the source of the second switching element Q2. With this process, excitation energy generates the output voltage, and a part of unnecessary energy returning to the input of the resonance returns to the input side, which accordingly reduces the time to reach the time point t0 in the region B (from the time point t5 to t0 via t6) in FIG. 1 (the slope remains the same).

Figure 13:
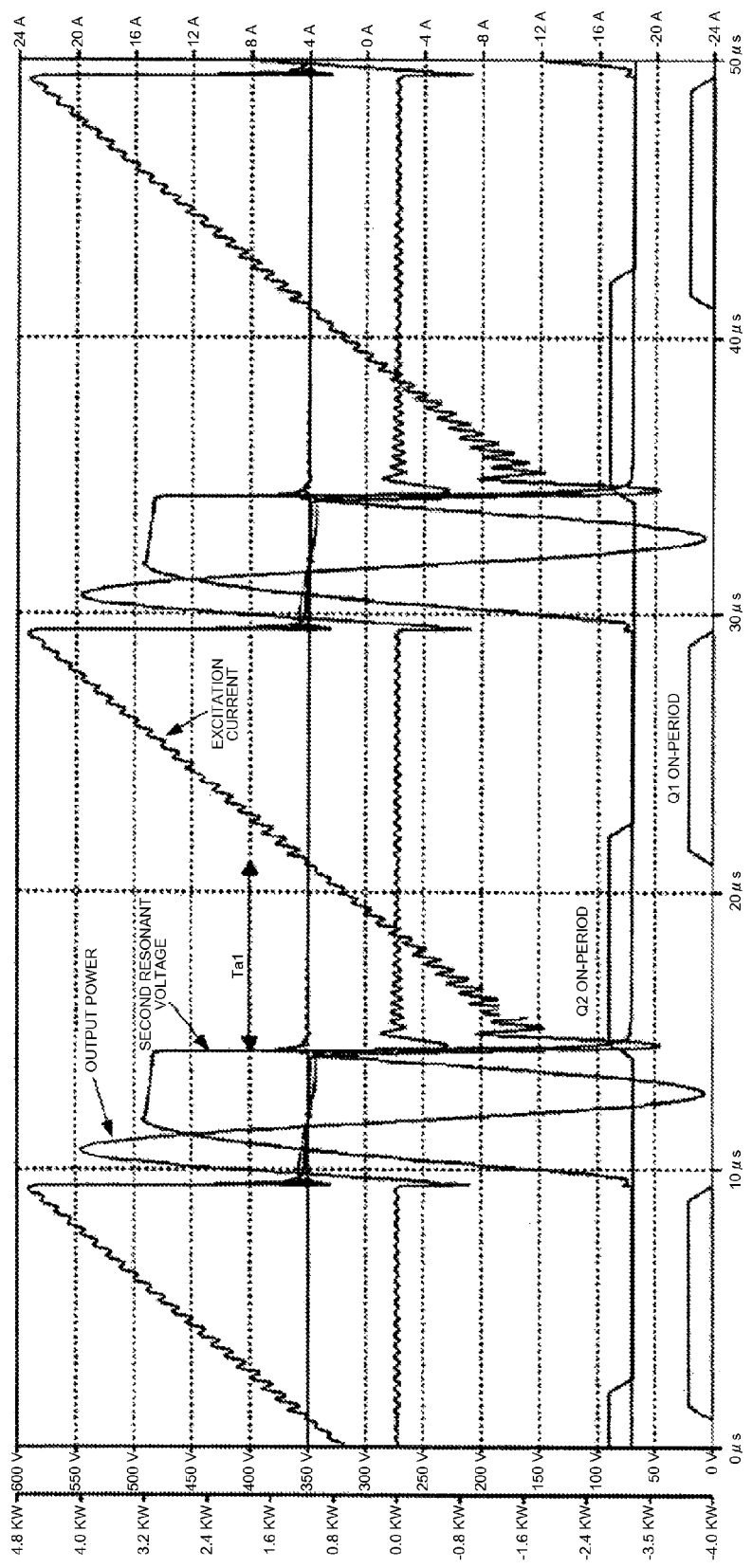
FIG. 13 is another similar timing chart and waveform chart that illustrates a result of observation when a second resonant circuit is not in a resonant state.

The voltage between (or at a signal ground) the cathode of the first diode D1 and the source of the second switching element Q2 while the second resonant circuit 4 is in the resonant state is affected by resonance of the output voltage. The distortion in the peak value of FIG. 11 results from the resonance of the output voltage. In other words, the distortion is caused by the voltage of the first switching element Q1 and the second resonant circuit 4 interacted with each other. Regardless of some distortion, this portion only needs to be in a resonant end state. FIG. 12 is a similar timing chart and a waveform chart that illustrates an observation result when an uncontrollable inhibited period Ta1 is reduced. The inhibited period Ta1 is reduced relative to a period p in FIG. 12. FIG. 13 is a similar timing chart and a waveform chart that illustrates an observation result when the second resonant circuit 4 is not in a resonant state. The flat form in the upper part of the second resonant voltage in FIG. 13 indicates that the voltage is not resonant.

The operation timing of the first switching element Q1 and the second switching element Q2 will now be described. As already described, it is preferable that the second switching element Q2 be turned on during the period after the region A where the output voltage is positive ends until the time point t5 in the region B where the output voltage is negative in FIG. 1. With regards to the output voltage, the voltage after the negative region B is reached is clamped at a voltage according to the turn ratio and the input voltage.

The second switching element Q2 may be turned off during a period after the first switching element Q1 is turned on until it is turned off. Specifically, the timing for turning off the second switching element Q2 may preferably at least overlap the region C where the output voltage is positive after the second order. The term "overlap" means that the first and the second switching elements Q1 and Q2 share the period of the on state. Turning on the first switching element Q1 in the region B of the output voltage in FIG. 1 does not substantially increase excitation energy of the step-up transformer 3, and the first switching element Q1 thus can be turned on in the regions C, D, E, and F. With regards to the off-operation of the first switching element Q1, the output voltage is monitored for controlling the pulse width modulation (PWM) or the pulse frequency modulation (PFM), and the on-ratio or the on-time is reduced if the voltage is excessive whereas the on-ratio or the on-time is increased if the voltage is short.

Figure 14:
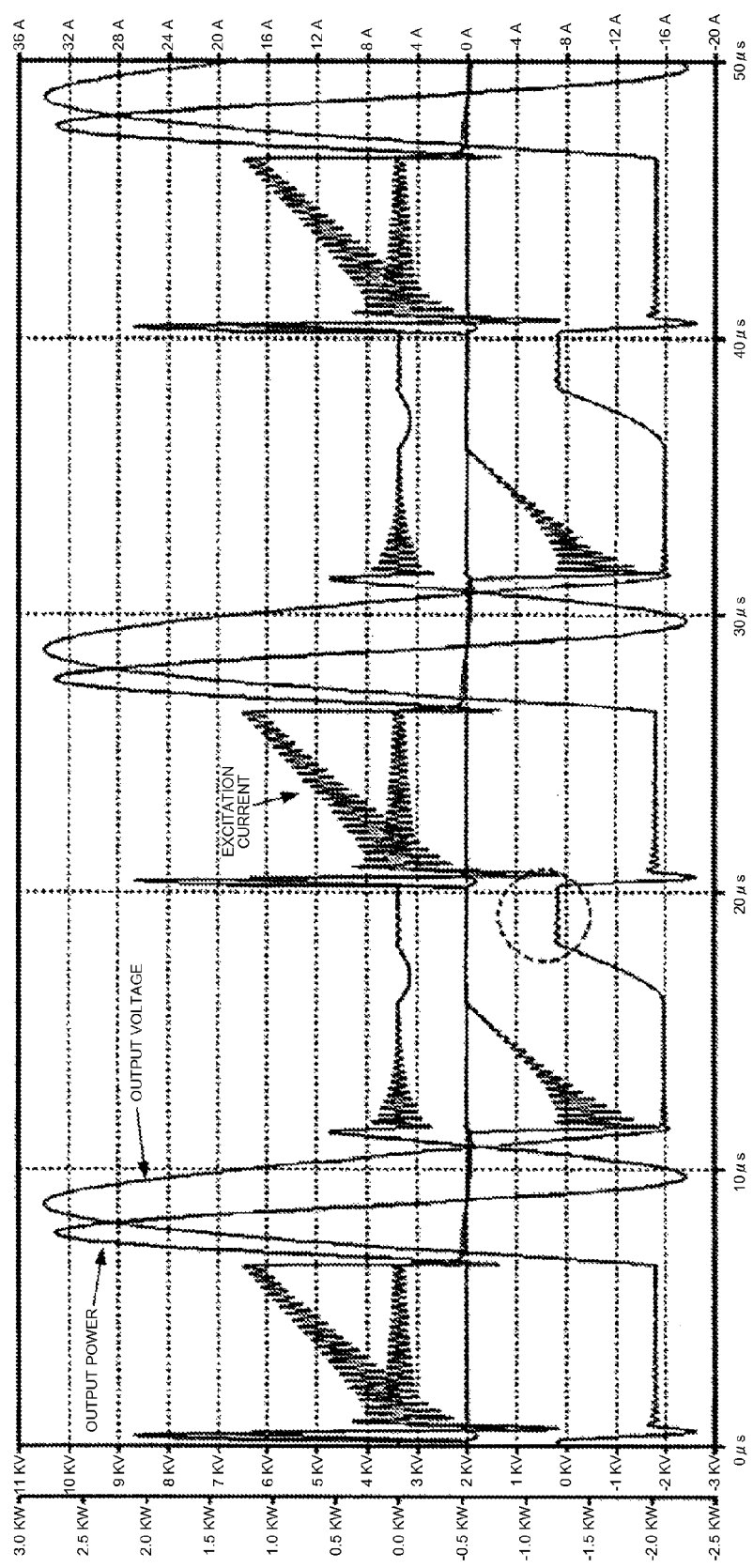
FIG. 14 is another similar timing chart and waveform chart that illustrates a first example of a status where the regions C and E in FIG. 1 have disappeared.

The small positive voltage in the regions C and E in FIG. 1 indicates substantially zero volts. Specifically, FIG. 14 is a drawing that illustrates a first example where the regions C and E in FIG. 1 disappear, in which a duty ratio is calculated as: 5.54/20=27.77%. In the portion indicated by a circle in a dashed line in FIG. 14, the voltage waveform disappears.

Figure 15:
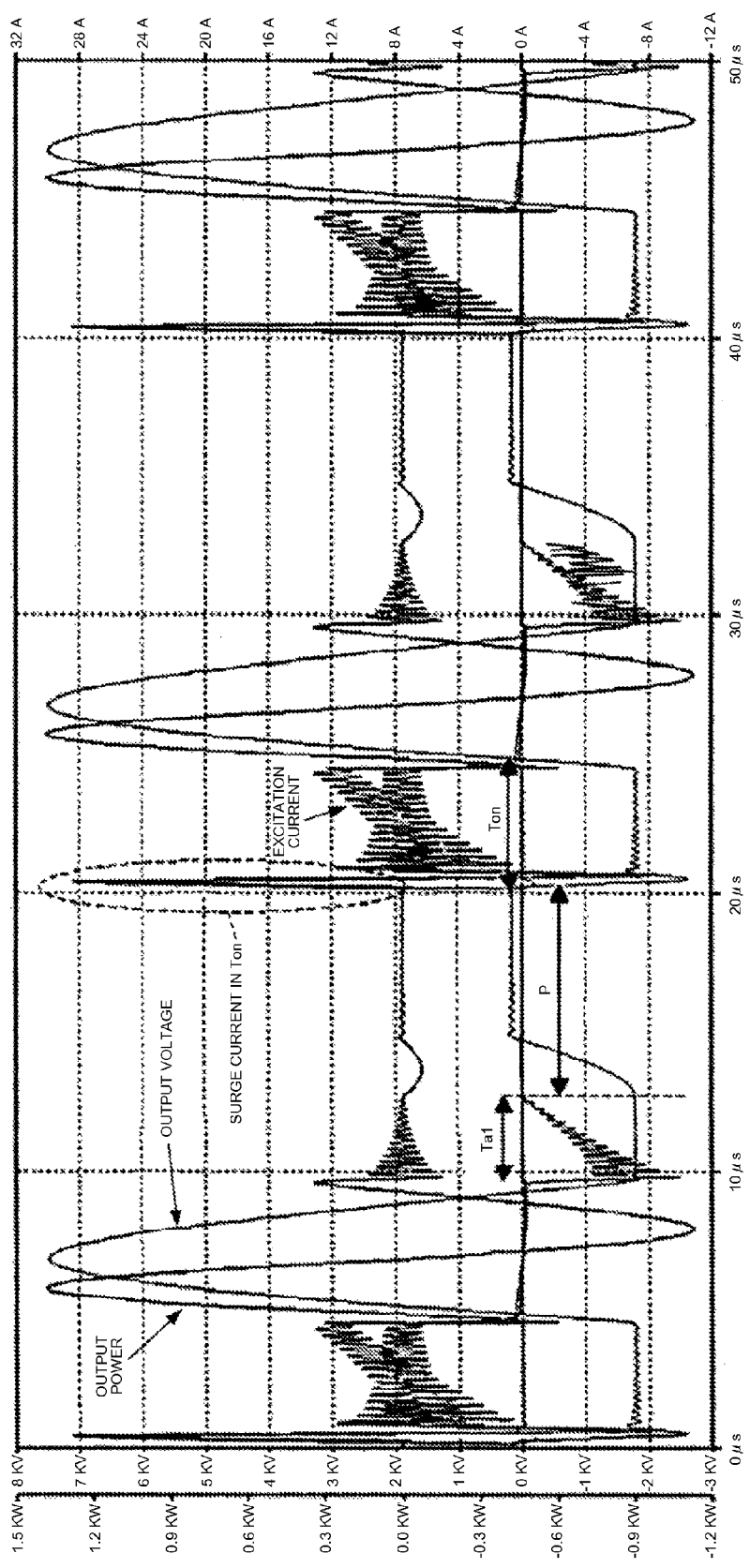
FIG. 15 is another similar timing chart and waveform chart that illustrates a second example of a status where the regions C and E in FIG. 1 have disappeared.

FIG. 15 is a drawing that illustrates a second example where the regions C and E in FIG. 1 disappear, in which a duty ratio is calculated as: 3.54/20=17.7%. FIG. 11 illustrates such a case that has a duty ratio of 8.44/20=42.2% and has the longest on-period of the first switching element Q1. Excitation energy at a higher duty ratio varies a little. In this manner, it is possible to widely change the duty ratio in the PWM control, that is, the ratio for the on-period of the first switching element Q1.

Storing excitation energy at a ratio higher than the duty ratio (the on-ratio) of FIG. 11 is not suitable to the PWM control because the amount of energy varies a little at such a ratio. In actual use, however, the excitation energy is stable under such a condition because the energy does not undergo the region C or E in FIG. 1. The duty ratio changes the output voltage and the period p extends according to the time width Ton of the excitation energy, and the inhibited time Ta1 decreases by the extension of the period p.

It is possible to control the range excluding the inhibited time by constantly monitoring the peak voltage (a peak value) of the output voltage. As described earlier, even when the first switching element Q1 is turned on in the inhibited time Ta1, the operation causes no troubles except that the excitation energy is not stored in the transformer. Turning on the first switching element Q1 in the region B of FIG. 1, which serves as the inhibited time Ta1, causes no troubles. It is, however, causes troubles if a time for excitation is insufficient. In this case, some countermeasures are taken that lower the switching frequency, lower the output inductance Ls of the transformer, or merely extend the actual time in which an excitation current flows.

When the excitation time is excessive, the peak value (a peak voltage value) of the output voltage becomes controllable at a constant level by performing such a control that decreases the on-period of the first switching element Q1. In the case of performing the PWM control, a current in an ordinary ringing form does not appear. By decreasing the duty ratio, however, a surge current deviating from the stable formula (2) flows at a threshold for turning on.

Figure 16:
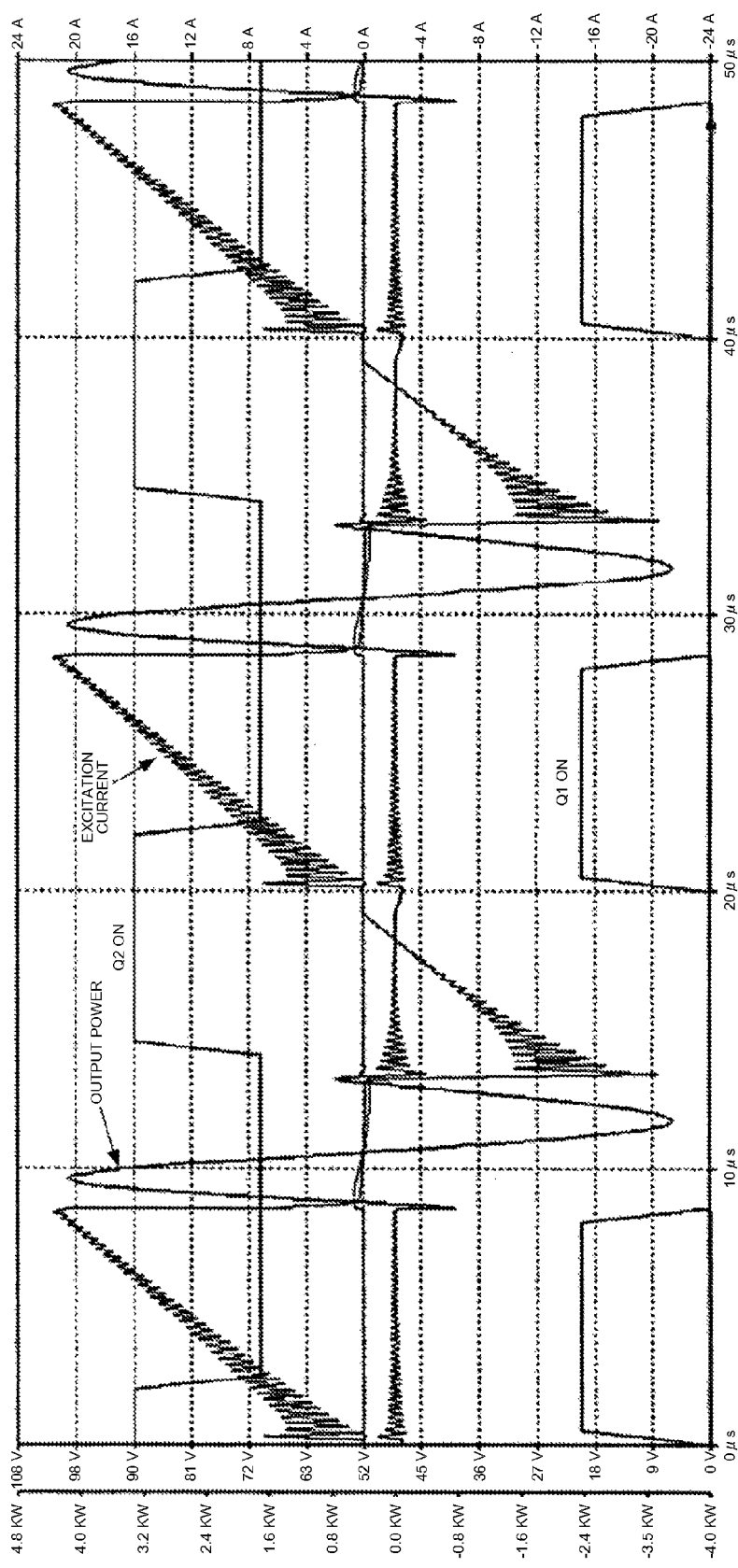
FIG. 16 is another similar timing chart and waveform chart that illustrates an example where a surge current generated when the first switching element is turned on is reduced by having a period in which the respective ON states of the first and a second switching elements are overlapped with each other.

This phenomenon is caused because the potential in the regions C and E of FIG. 1 is not completely zero and is also caused by effects of the output voltage and the making current flowing into the load 10. Furthermore, the phenomenon results from factors such as delay in response due to the output capacitance Coss of the first switching element Q1 and stray capacitance of the transformer. When the first switching element Q1 and the second switching element Q2 are both in the on state, a surge current is reduced as illustrated in FIG. 16.

Figure 17:
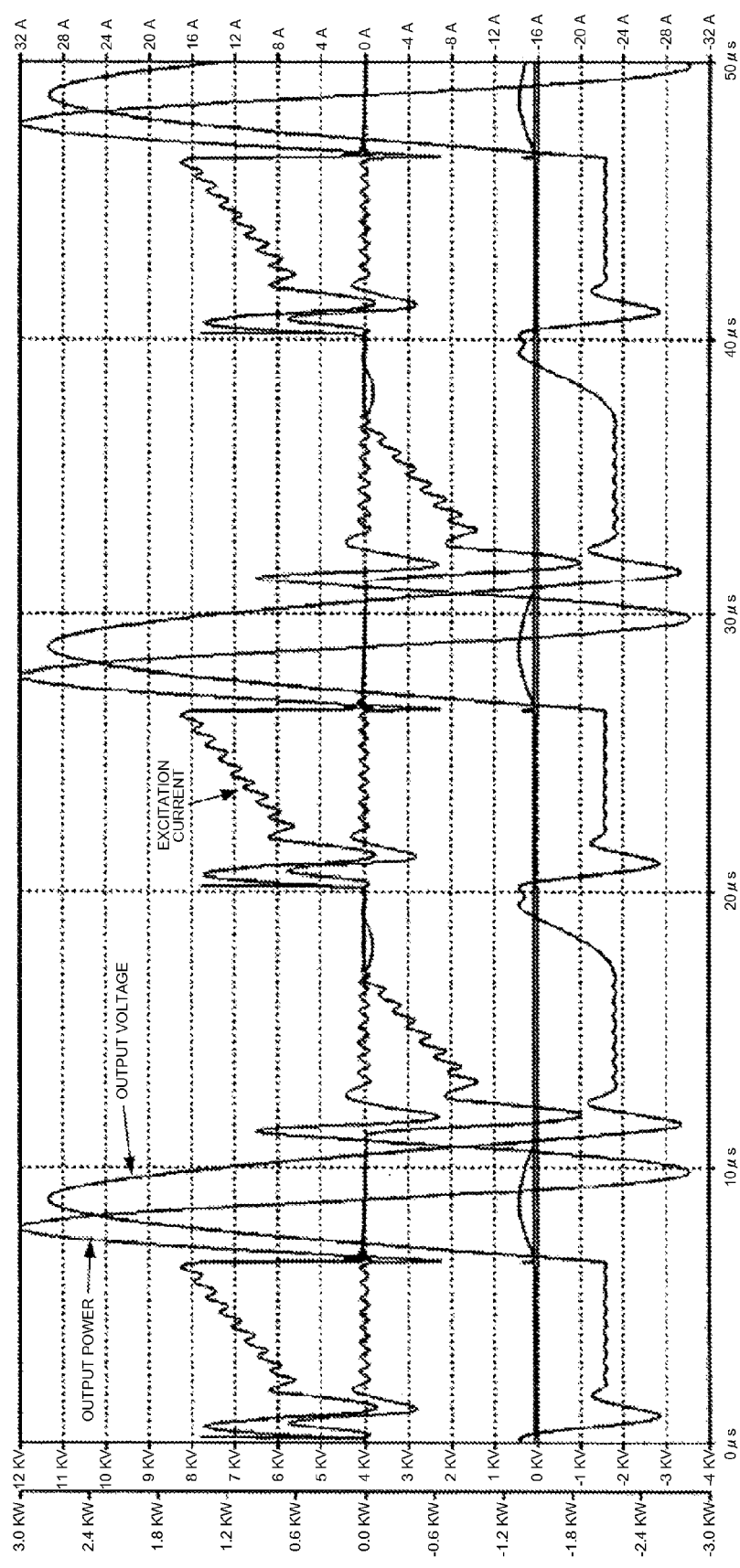
FIG. 17 is another similar timing chart and waveform chart that illustrates an example where a surge current is reduced by arranging a small inductor on the path where the current of the first switching element flows.

A surge current is reduced as illustrated in FIG. 17 by simply arranging a small inductor (herein 1 µH) on the path where a current to the first switching element Q1 flows. A current flowing into the output capacitance Coss before the first switching element Q1 is turned on causes an operational delay, thereby generating a surge current; however, the small inductance can delay the time in which the current flows into the output capacitance Coss. If the period p (see FIG. 15) is generated in the region C in FIG. 1, a surge current illustrated in FIG. 15 can be removed by having a central processing unit (CPU) or other device performs the PFM control to delete the period p in the next period. FIG. 11 illustrates the best condition.

According to each of the embodiments, potential at the cathode of the first diode D1 becomes zero between input voltages by keeping the second resonant circuit in a resonant state while the output voltage is generated. Even if the first switching element Q1 is turned on in the state, no transient voltage or current is generated. When the output voltage is maintained, substantially all the energy returning to the input side is absorbed in the input voltage Vin by the second switching element Q2, whereby subsequent energy exchanges repeated between the input and the output are canceled. This process makes it possible to exclusively extract necessary output voltage, extend a controllable time, and control peak values of the output voltage at a constant level.

A ringing transient current generated upon the on-time of the first switching element Q1 is reduced by creating and extending a period in which the respective on-periods of the first and the second switching elements Q1 and Q2 overlap each other.

In the case of the embodiment illustrated in FIG. 10, such an overlapping portion of the on-periods of the first and the second switching elements Q1 and Q2 cannot be created because no second diode D2 is used in this case. A current is thus increased in the on-time of the first switching element Q1. However, while the first switching element Q1 is on, the capacitor C1 of the first resonant circuit is charged and discharged because the potential at a direct connecting position where the second diode D2 is removed is decreased to a level between the input voltages. When the first switching element Q1 is off, energy exchanges, which are repeatedly caused between the input and the output when excessive voltage returns, are canceled. This process makes it possible to exclusively extract a necessary output voltage, extend a controllable time, and control a peak voltage of the output at a constant level.

Invention of Control Method, Surface Treatment Device, and Others

An embodiment of a control method according to the present invention relates to a method for controlling the above-described voltage resonant inverter. When the excitation current of the step-up transformer 3 is shut off, voltage generated at the connection point a between the excitation winding and the first switching element Q1 makes the second resonant circuit 4 provided in the primary side of the step-up transformer 3 in a resonant state.

The second switching element Q2 provided to the second resonant circuit is kept off during the resonant state of the second resonant circuit 4 and is turned on when the resonant state ends. After the second switching element Q1 is turned on, the second diode D2 commutates a current resulting from energy returning to the input side in the region where the output voltage Vout is negative, so that the current is absorbed in the input voltage Vin. The second switching element Q2 is turned off during the time of turning on to turning off of the first switching element Q1. Effects exerted by this control method have been described in each of the above-described embodiments of the inverters.

A surface treatment device in an embodiment according to the present invention includes any one of the voltage resonant inverters in the above-described embodiments and a plasma generator to which the output voltage of the voltage resonant inverter is applied. The plasma generator corresponds to the load 10 in each of the above-described embodiments. Surface treatment devices are used in various industrial products. For example, in processes such as attaching, printing, coating of resin and other materials, wetting characteristics can be improved by performing pre-processing of surface treatment with atmospheric-pressure plasma.

For example, when ultraviolet cure varnish is applied on a printed material where resin toner is printed by an image forming device using electrophotography, a wax ingredient included in the resin toner may repel varnish applied to a portion where the resin toner is printed. Surface treatment performed by a surface treatment device with atmospheric-pressure plasma improves wet characteristics and accordingly allows varnish coating, which adds higher values to the printed material. High voltage is necessary to generate atmospheric-pressure plasma, and the above-described voltage resonant inverter can efficiently apply high voltage and stably generate radical species.

The voltage resonant inverter according to the present invention can be used as a high voltage power source device supplying high voltage to various kinds of devices such as a semiconductor wafer bonding device, an image processing apparatus, a painting device, a lighting device such as a fluorescent lamp, an air cleaner, a discharging apparatus, a backlight of a liquid crystal television, and a sterilization device.

An exemplary circuit, an exemplary operation, a modification, and the like in the above-described embodiments can be changed, added, or partly deleted as appropriate. Any combination of these examples can also be applicable as long as the combination does not cause inconsistency with one another.

A voltage resonant inverter of the present invention can considerably reduce a time (a time in an inhibiting condition) in which a switching element cannot be turned on and extend the control range for making peak values on the output voltage constant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A voltage resonant inverter comprising:
a step-up transformer having an excitation winding and an output winding; and
a first switching element that switches an input voltage and intermittently applying an excitation current to the excitation winding, wherein
excitation energy stored in the step-up transformer during a period when the excitation current is applied causes a voltage resonant state in a secondary side of the step-up transformer during a period when the excitation current is shut off and generates an alternating output voltage on the output winding, and
the voltage resonant inverter further comprises:
a resonant circuit that is provided in a primary side of the step-up transformer and enters a resonant state by a voltage generated at a connection point between the excitation winding and the first switching element when the excitation current is shut off, and includes a second switching element;
a first diode that is provided between a frame ground and the resonant circuit, and commutates a current resulting from energy returning to an input side in a region where the alternating output voltage is negative after the second switching element is turned on so that the current is absorbed in the input voltage; and
a switching element control circuit that keeps the second switching element off while the resonant circuit is in a resonant state, turns on the second switching element when the resonant state ends, and turns off the second switching element during a period after the first switching element is turned on until the first switching element is turned off.

2. The voltage resonant inverter according to claim 1, further comprising a second diode an anode of which is connected to a connection point between a first end of the excitation winding and the first switching element, wherein
the resonant circuit includes a capacitor connected between a power wire supplying the input voltage to a second end of the excitation winding and a cathode of the second diode, a first inductor a first end of which is connected to the cathode of the second diode, and the second switching element connected between a second end of the first inductor and the power wire.

3. The voltage resonant inverter according to claim 2, wherein the switching element control circuit turns off the second switching element at the same time when the first switching element is turned off.

4. The voltage resonant inverter according to claim 2, wherein the resonant circuit has a resistance arranged, in series with the capacitor, between the capacitor and the connection point between the capacitor and the first end of the first inductor.

5. The voltage resonant inverter according to claim 2, wherein the resonant circuit has a second inductor arranged, in series with the capacitor, between the capacitor and the connection point between the capacitor and the first end of the first inductor.

6. The voltage resonant inverter according to claim 2, wherein the first diode has an anode connected to the frame ground and has a cathode connected to the connection point between the capacitor and the first end of the first inductor.

7. The voltage resonant inverter according to claim 2, wherein the first diode has an anode connected to the frame ground and has a cathode connected to a connection point between the second end of the first inductor and the second switching element.

8. The voltage resonant inverter according to claim 1, wherein
the resonant circuit includes a capacitor connected between a connection point between a first end of the excitation winding and the first switching element and a power wire supplying the input voltage to a second end of the excitation winding, an inductor a first end of which is connected to a connection point between the capacitor and the first end of the excitation winding, and the second switching element connected between a second end of the inductor and the power wire, and
the switching element control circuit turns off the second switching element at the same time when the first switching element is turned on.

9. The voltage resonant inverter according to claim 1, further comprising:
a circuit that detects a peak value of the alternating output voltage and generates a feedback signal; and
a pulse width modulation control circuit that controls a duty ratio of a switching signal turning on and off the first switching element in a predetermined period according to the feedback signal generated by the circuit.

10. The voltage resonant inverter according to claim 1, wherein
the step-up transformer includes a plurality of individual transformers having a common characteristic,
excitation windings of the respective transformers are connected in parallel and simultaneously excited, and
output windings of the respective transformers are connected in series with one another.

11. A surface treatment device comprising:
the voltage resonant inverter according to claim 1; and
a plasma generator to which the alternating output voltage of the voltage resonant inverter is applied.

12. A method of controlling a voltage resonant inverter that includes a step-up transformer having an excitation winding and an output winding and a first switching element switching an input voltage and intermittently applying an excitation current to the excitation winding, in which excitation energy stored in the step-up transformer during a period when the excitation current is applied causes a voltage resonant state in a secondary side of the step-up transformer during a period when the excitation current is shut off and generates an alternating output voltage on the output winding, the method comprising:

causing a resonant circuit provided in a primary side of the step-up transformer to enter a resonant state with a voltage generated at a connection point between the excitation winding and the first switching element when the excitation current is shut off;

keeping a second switching element provided to the resonant circuit off during a resonant state of the resonant circuit and turning on the second switching element when the resonant state ends;

commutating current resulting from energy returning to an input side in a region where the alternating output voltage is negative, with a diode after the second switching element is turned on so that the current is absorbed in the input voltage; and turning off the second switching element during a period after the first switching element is turned on until the first switching element is turned off.

13. The method of controlling the voltage resonant inverter according to claim 12, further comprising:

detecting a peak value of the alternating output voltage and generating a feedback signal; and controlling a duty ratio of a switching signal turning on and off the first switching element in a predetermined period according to the feedback signal.

* * * * *